US010225650B2

United States Patent
Tatematsu et al.

(10) Patent No.: US 10,225,650 B2
(45) Date of Patent: Mar. 5, 2019

(54) DIRECTIVITY CONTROL SYSTEM, DIRECTIVITY CONTROL DEVICE, ABNORMAL SOUND DETECTION SYSTEM PROVIDED WITH EITHER THEREOF AND DIRECTIVITY CONTROL METHOD

(71) Applicant: PANASONIC INTELLECTUAL PROPERTY MANAGEMENT CO., LTD., Osaka (JP)

(72) Inventors: Hideki Tatematsu, Hyogo (JP); Shugo Yamamiya, Kanagawa (JP); Takatsugu Ito, Kanagawa (JP); Xia Yang, Fukuoka (JP); Yoshikazu Otonari, Fukuoka (JP); Hiroyuki Maruyama, Kanagawa (JP); Masanori Hagihara, Fukuoka (JP); Ryuuichi Yatsunami, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/533,399

(22) PCT Filed: Dec. 16, 2015

(86) PCT No.: PCT/JP2015/006266
§ 371 (c)(1),
(2) Date: Jun. 6, 2017

(87) PCT Pub. No.: WO2016/103645
PCT Pub. Date: Jun. 30, 2016

(65) Prior Publication Data
US 2017/0353788 A1    Dec. 7, 2017

(30) Foreign Application Priority Data
Dec. 22, 2014 (JP) .................................. 2014-259321
Dec. 22, 2014 (JP) .................................. 2014-259323

(51) Int. Cl.
H04R 1/40 (2006.01)
H04N 7/18 (2006.01)
(Continued)

(52) U.S. Cl.
CPC ........... *H04R 1/406* (2013.01); *G06F 3/0486* (2013.01); *G06F 3/04845* (2013.01);
(Continued)

(58) Field of Classification Search
CPC ........ H04R 1/406; H04R 1/326; H04R 27/00; H04R 3/005; H04R 2201/401;
(Continued)

(56) References Cited

U.S. PATENT DOCUMENTS 3,837,736 A * 9/1974 Ogiso .................... G03B 31/04
352/1
9,414,153 B2    8/2016 Shigenaga et al.
(Continued)

FOREIGN PATENT DOCUMENTS

JP    10-063967 A    3/1998
JP    2004-227116    8/2004
(Continued)

OTHER PUBLICATIONS

International Search Report issued in International Patent Application No. PCT/JP2015/006266, dated Jan. 26, 2016.

Primary Examiner — Jason R Kurr
(74) Attorney, Agent, or Firm — Greenblum & Bernstein, P.L.C.

(57) ABSTRACT

By registering a set range and a sound type which are not subject to detection of an abnormal sound in advance, a PC performs an alert notification in a case of detecting a sound which is regarded as an abnormal sound, and does not perform an alert notification in a case of detecting a sound which is not regarded as an abnormal sound. That is, in a
(Continued)

target area such as a hotel lobby, a sound output from a television provided therein, a water sound emitted by a fountain, and the like are no longer erroneously detected as an abnormal sound. Further, the PC forms the directivity of sound data in a direction toward an actual position corresponding to a designated position on an image of a sound pickup area displayed on a display.

14 Claims, 15 Drawing Sheets

(51) Int. Cl.
| | | |
|---|---|---|
| *G06F 3/0484* | (2013.01) | |
| *G06F 3/0488* | (2013.01) | |
| *H04N 5/232* | (2006.01) | |
| *G08B 13/16* | (2006.01) | |
| *H04R 3/00* | (2006.01) | |
| *G06F 3/0486* | (2013.01) | |
| *G06F 3/16* | (2006.01) | |
| *G08B 13/196* | (2006.01) | |

(52) U.S. Cl.
CPC .......... *G06F 3/04883* (2013.01); *G06F 3/165* (2013.01); *G08B 13/1672* (2013.01); *H04N 5/23293* (2013.01); *H04N 5/23296* (2013.01); *H04N 7/18* (2013.01); *H04R 3/005* (2013.01); *G06F 2203/04803* (2013.01); *G06F 2203/04806* (2013.01); *G08B 13/1963* (2013.01)

(58) Field of Classification Search
CPC ............. H04R 2227/003; G06F 3/0304; G06F 3/04845; G06F 3/04883; G06F 3/0486; G06F 3/165; G06F 2203/04803; G06F 2203/04806; H04N 9/802; H04N 7/18; H04N 5/23293; H04N 5/23296; G06K 9/00771; G08B 13/1672; G08B 13/1963
See application file for complete search history.

(56) References Cited

U.S. PATENT DOCUMENTS

| | | | |
|---|---|---|---|
| 9,516,412 | B2 | 12/2016 | Shigenaga et al. |
| 2010/0123785 | A1* | 5/2010 | Chen ................. H04N 5/23219 348/207.11 |
| 2010/0254543 | A1* | 10/2010 | Kjolerbakken ........ H04R 1/406 381/92 |
| 2013/0342731 | A1* | 12/2013 | Lee .................... H04N 5/23293 348/231.4 |
| 2015/0350621 | A1 | 12/2015 | Sawa et al. |

FOREIGN PATENT DOCUMENTS

| | | |
|---|---|---|
| JP | 2008-141281 | 6/2008 |
| JP | 2008-271082 | 11/2008 |
| JP | 2014-143678 | 8/2014 |

* cited by examiner

FIG. 2A

| NUMBER | SET RANGE | SOUND OTHER THAN DETECTION TARGET | REMARKS |
|---|---|---|---|
| L1 | B1,C1 | WATER SOUND | |
| L2 | B6,C6 | ALL SOUNDS | |
| ⋮ | ⋮ | ⋮ | |

FIG. 2B

| SOUND OTHER THAN DETECTION TARGET | | | | |
|---|---|---|---|---|
| WATER SOUND | EXPLOSION SOUND | ALL SOUNDS | SCREAM | ... |

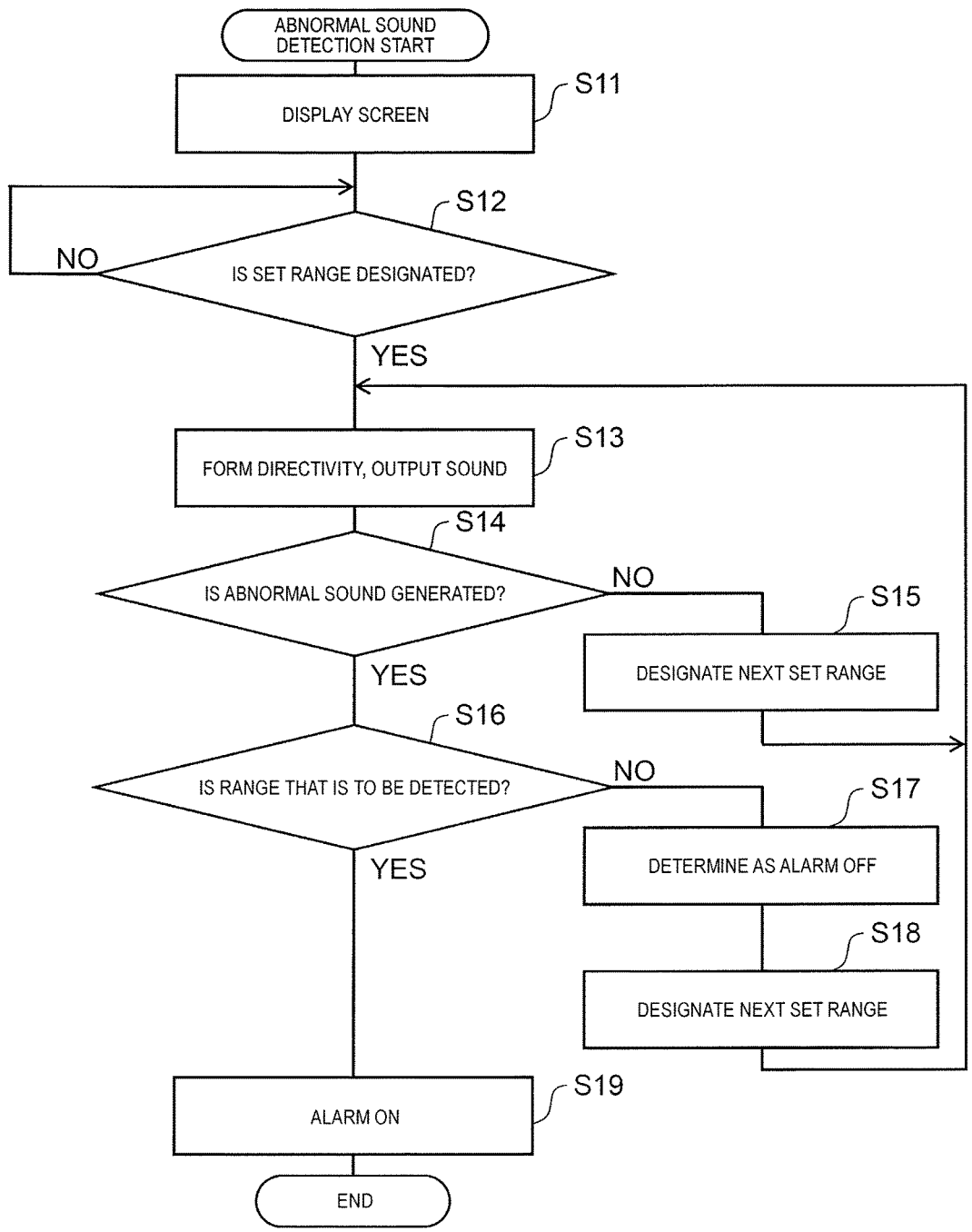

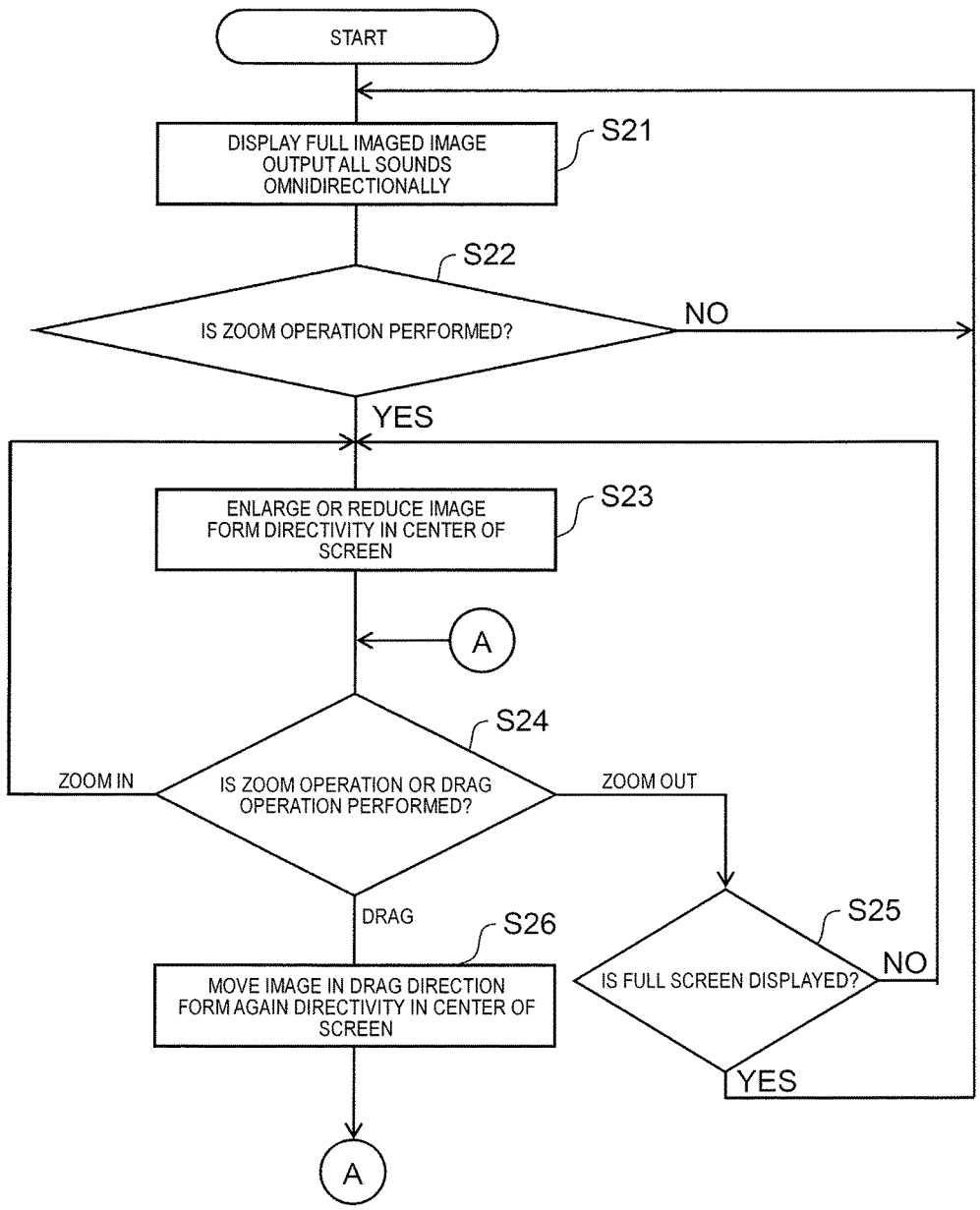

FIG. 14
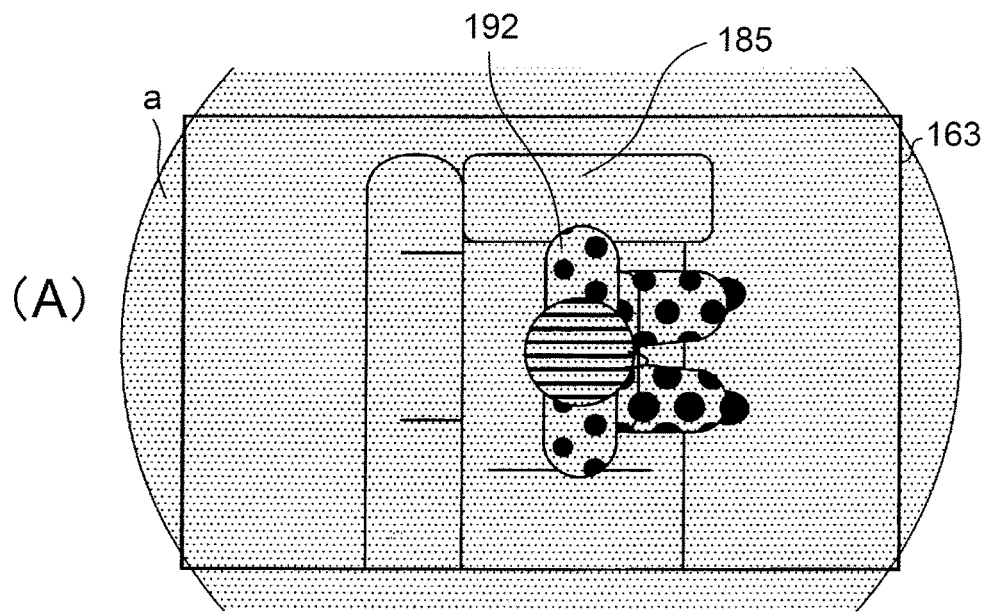
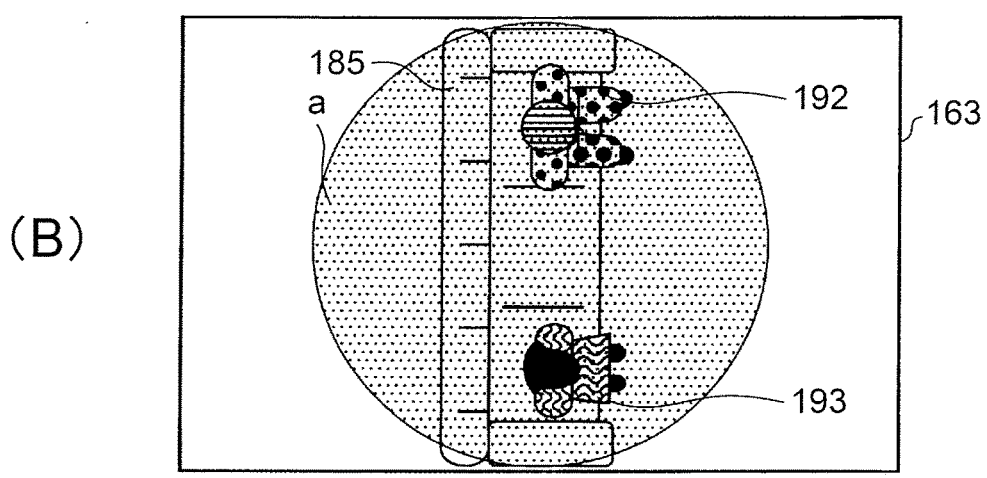

FIG. 15
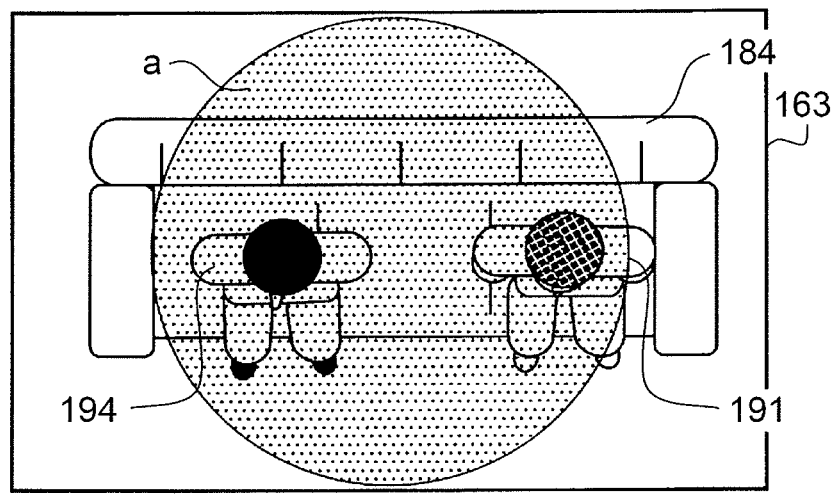
(A)
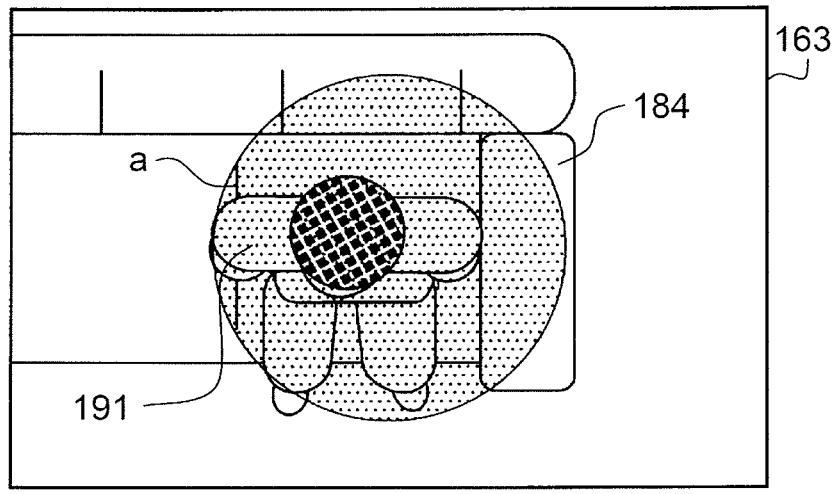
(B)

DIRECTIVITY CONTROL SYSTEM, DIRECTIVITY CONTROL DEVICE, ABNORMAL SOUND DETECTION SYSTEM PROVIDED WITH EITHER THEREOF AND DIRECTIVITY CONTROL METHOD

TECHNICAL FIELD

The present disclosure relates to a directivity control system and a directivity control device which form directivity of picked up sound, an abnormal sound detection system provided with either thereof which detects an abnormal sound, and a directivity control method.

BACKGROUND ART

As a security apparatus, an information processing apparatus is known in PTL 1 which outputs a warning sound to inform detection of an abnormal sound when detecting the abnormal sound generated within a predetermined area (for example, see PTL 1). In the information processing apparatus shown in PTL 1, the type of the detected abnormal sound is determined.

Then, an apparatus has been known which forms the directivity of a sound in a direction toward the actual position corresponding to the position selected from the microphone array, and plays back the sound of which directivity is formed, when monitoring an image in real time or playing back later the sound which was picked up previously and checking it, by using a microphone array and a camera integrally or separately, if a certain position on the image from a camera is selected (for example, see PTL 2).

However, in a case where an abnormal sound is detected at a place within the area, a warning sound is output uniformly and is notified to the user, but it may be preferable not to output a warning sound depending on a situation in the area in terms of not reducing the convenience of the user.

For example, a big sound output from a television or an audio device provided in an area is erroneously detected as an abnormal sound, which may degrade the convenience of the user who is an observer. Such a sound is used in the program for the purpose of entertainment of the viewer or the listener of the sound output from the television or the audio device, and in other words, is a sound that is not regarded as an abnormal sound.

Furthermore, in a case where the directivity of a sound is formed for the image from the camera having a fixed angle of view, and an operation such as a zoom in or zoom-out operation is performed on the image from the camera, a method of forming the directivity of the sound is not considered. Similarly, in a case where the camera is a pan tilt zoom (PTZ) camera which is freely driven in a pan direction and a tilt direction and is capable of changing an optical axis, the image displayed on the display is switched by driving the PTZ camera, but in such a case, a method of forming the directivity of the sound is not considered.

Therefore, in a case where the zoom operation or the like is performed on the image imaged by the camera, the imaged image displayed on the display and the position where the directivity of the sound is formed (sound position) do not match (that is, not one-to-one correspondence). For example, when a plurality of people displayed on the display are on conversation, even if the user zooms in a specific person and the face of the person is enlarged and displayed on the screen, a voice other than the voice of the person is output from a speaker, or the voice of the person is output while the volume is small, such that an operator is likely to feel uncomfortable.

Therefore, each time the screen displayed on the display is switched, the user specifies a desired position on the image displayed on the switched screen, the directivity of the sound needs to be formed again in a direction corresponding to the position, and there is a possibility that the operation of the user becomes complicated.

An object of the present disclosure is to associate the displayed image of a sound pickup area with a position where the directivity of a sound picked up in the sound pickup area is formed, and follow and switch the position where the directivity of a sound is formed, according to the switching of the displayed image. Furthermore, an object of the present disclosure is to clearly distinguish a sound which is not regarded as an abnormal sound.

CITATION LIST

Patent Literature

PTL 1: Japanese Patent Unexamined Publication No. 2004-227116
PTL 2: Japanese Patent Unexamined Publication No. 2014-143678

SUMMARY OF THE INVENTION

A directivity control system of the present disclosure includes a sound pickup device that picks up a sound in a sound pickup area, an imaging device that images the sound pickup area, a display unit that displays the image of the sound pickup area imaged by the imaging device, an operation unit that allows an input operation of a designated position on a display area of the display unit and a switching operation of a display range of the image, and a directivity formation unit that forms directivity of sound data of the sound picked up by the sound pickup device, in which the directivity formation unit forms the directivity in a direction corresponding to the designated position on the image displayed on the display unit after a switching operation of the display range.

A directivity control device of the present disclosure includes a sound pickup unit that picks up a sound in a sound pickup area, an imaging unit that images the sound pickup area, a display unit that displays the image of the sound pickup area imaged by the imaging unit, an operation unit that enables an input operation of a designated position on a display area of the display unit and a switching operation of a display range of the image, and a directivity formation unit that forms directivity of sound data of the sound picked up by the sound pickup unit, in which the directivity formation unit forms the directivity in a direction corresponding to the designated position on the image displayed on the display unit after a switching operation of the display range.

An abnormal sound detection system of the present disclosure is an abnormal sound detection system including an abnormal sound detection device which is connected to either the directivity control system or the directivity control device, in which the sound pickup device includes a sound pickup unit that picks up a sound in a sound pickup area including a plurality of abnormal sound detection areas, and the abnormal sound detection device includes a storage unit that stores an abnormality notification exclusion list in which each of the abnormal sound detection areas and an abnormal sound are associated with each other, a directivity formation unit that forms directivity in a direction designated depending on any one of the abnormal sound detection areas, for the sound picked up by the sound pickup unit, and a notification unit that in a case where an abnormal sound is detected in the sound of which the directivity is formed in any one of the abnormal sound detection areas in the abnormality notification exclusion list, does not perform an alert notification corresponding to the detected abnormal sound, and in a case where an abnormal sound is detected in the sound of which the directivity is formed in a detection area other than any one of the abnormal sound detection areas in the abnormality notification exclusion list, performs an alert notification corresponding to the detected abnormal sound.

A directivity control method of the present disclosure in a directivity control system including a sound pickup device and an imaging device, includes a step of picking up a sound in a sound pickup area by the sound pickup device, a step of imaging the sound pickup area by the imaging device, a step of displaying the image of the sound pickup area which is imaged by the imaging device on a display unit, a step of performing an input operation of a designated position on a display area of a display unit, a step of performing a switching operation of a display range of the image, and a step of forming directivity of sound data of the sound picked up by the sound pickup device, in the formation of directivity, the directivity is formed in a direction corresponding to the designated position on the image displayed on the display unit after the switching operation of the display range.

A directivity control method of the present disclosure in a directivity control device including a sound pickup unit and an imaging unit, includes a step of picking up a sound in a sound pickup area by the sound pickup unit, a step of imaging the sound pickup area by the imaging unit, a step of displaying the image of the sound pickup area which is imaged by the imaging unit on a display unit, a step of performing an input operation of a designated position on a display area of a display unit, a step of performing a switching operation of a display range of the image, and a step of forming directivity of sound data of the sound picked up by the sound pickup device, in the formation of directivity, the directivity is formed in a direction corresponding to the designated position on the image displayed on the display unit after the switching operation of the display range.

According to the present disclosure, the displayed image of a sound pickup area and a position where the directivity of a sound picked up in a sound pickup area is formed can be associated with each other, the position where the directivity of a sound is formed can be followed and switched, according to the switching of the image displayed on the display unit. Furthermore, according to the present disclosure, it is possible to clearly distinguish a sound which is not regarded as an abnormal sound, and improve the convenience of the user.

BRIEF DESCRIPTION OF DRAWINGS

FIG. 2A is a diagram showing an example of registration contents of a list of designated range other than a detection target.

FIG. 2B is a diagram showing an example of registration contents of a list of sound types other than a detection target.

FIG. 7 is a flowchart illustrating an example of an abnormal sound detection process procedure by a PC.

FIG. 12 is a flowchart illustrating an example of a forming operation procedure of directivity in a case where a zoom operation or a drag operation is performed in the directivity control system of Exemplary Embodiment 2.

FIG. 14 is a diagram illustrating in (A) and (B) the image displayed on the screen of the display and the sound directivity range, subsequent to FIG. 13.

FIG. 15 is a diagram illustrating in (A) and (B) an imaged image displayed on the screen of the display and the sound directivity range, in a case where the sound directivity range is changed to a size corresponding to a zoom magnification.

DESCRIPTION OF EMBODIMENTS

Exemplary Embodiment 1

Hereinafter, an exemplary embodiment which specifically discloses an abnormal sound detection system according to the present disclosure (hereinafter, referred to as "Exemplary Embodiment 1") will be described with reference to the drawings.

Figure 1:
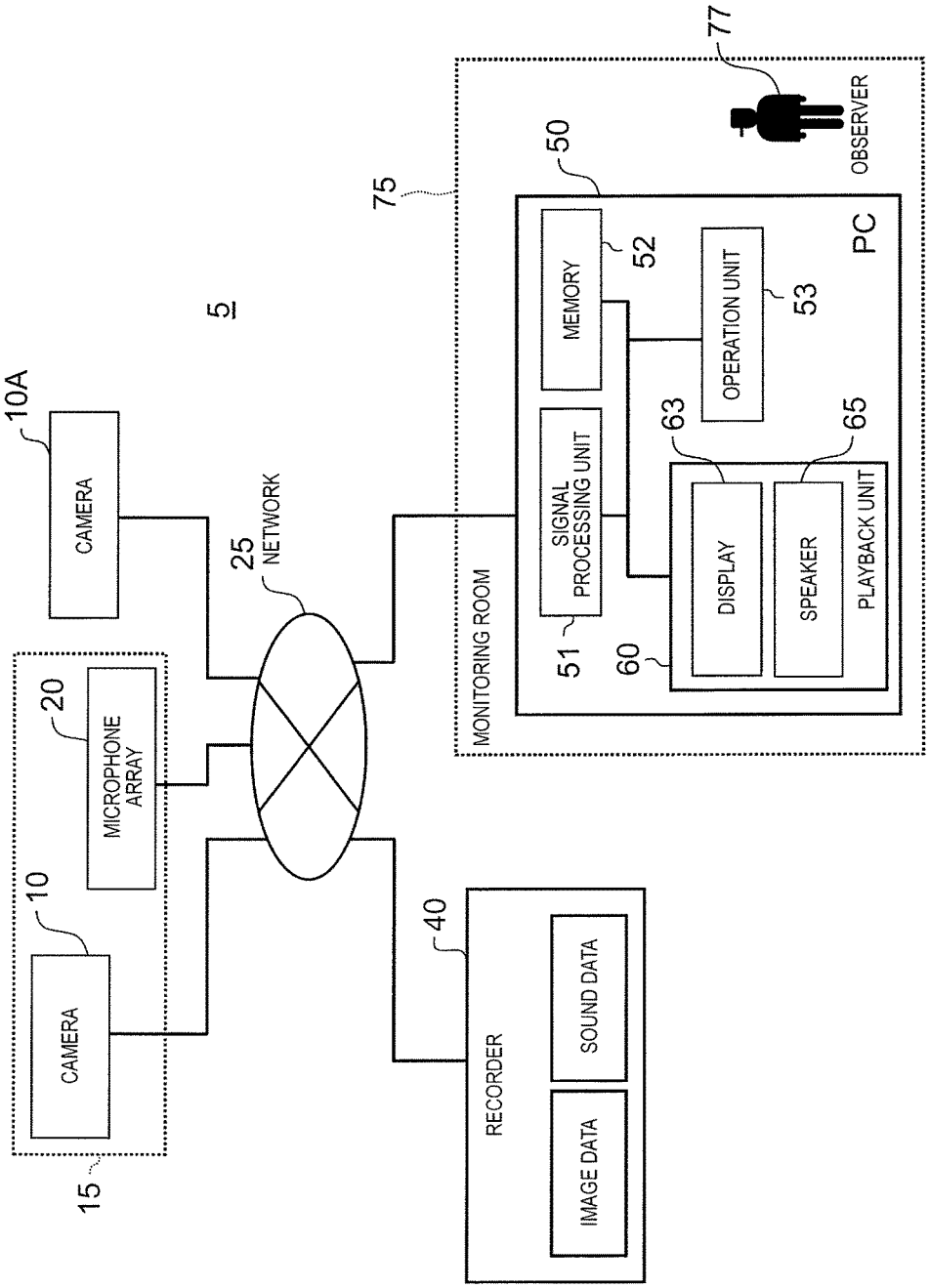
FIG. 1 is a block diagram showing an example of a system configuration of an abnormal sound detection system of the present exemplary embodiment.

FIG. 1 is a block diagram showing an example of a system configuration of abnormal sound detection system 5 of Exemplary Embodiment 1. Abnormal sound detection system 5 shown in FIG. 1 has a configuration in which cameras 10 and 10A for monitoring, microphone array 20, recorder 40, and personal computer (PC) 50 are connected with each other through network 25.

Camera 10 and microphone array 20 are disposed, for example, around camera 10, and microphone array 20 having a ring-shaped casing is inserted so as to surround camera 10 to construct monitoring unit 15 in which camera 10 and microphone array 20 are integrated. Camera 10A has the same configuration as camera 10, and is an independently arranged camera that images a target area different from camera 10. Hereinafter, for the sake of simplicity of description, camera 10 is described, and the operation of camera 10A will be omitted, but camera 10A operates similar to camera 10. As a monitoring target area of an abnormal sound in abnormal sound detection system 5, for example, a hotel lobby is illustrated in Exemplary Embodiment 1.

Camera 10 as an example of the imaging device is an omnidirectional camera provided as a surveillance camera on the ceiling of the hotel lobby and capable of imaging omnidirectional images by being equipped with a fisheye lens on the front surface, and images surrounding images (including still images and moving images) of a monitoring target point (place). Camera 10 transfers data of imaged image (image data) to PC 50 in monitoring room 75 through network 25, and records the data in recorder 40.

In addition, camera 10 may be a PTZ camera having a pan function, a tilt function, a zoom-in function, and a zoom-out function (hereinafter, referred to as a pan tilt zoom (PTZ) function) that can be operated remotely from PC 50 in monitoring room 75, or may be a fixed camera with a fixed angle of view that images a predetermined position.

Microphone array 20 as an example of the sound pickup device is provided on the ceiling of a hotel lobby, and includes a casing in which a plurality of microphones 22 (for example, see FIG. 4) as an example of the sound pickup device are provided uniformly. Microphone array 20 picks up the sound around the monitoring target point (place) using each microphone 22, transmits the data (sound data) of the sound picked up by each microphone 22 to PC 50 in monitoring room 75 through network 25, and records the data in recorder 40. In addition, each microphone 22 may be an omnidirectional microphone, or a bidirectional microphone, a unidirectional microphone, an acute directional microphone, or a super directional microphone (for example, a gun microphone), or a combination thereof may be used.

Recorder 40 is configured to include a control unit that controls each process such as recording of data, and a recording unit that stores image data and sound data. Recorder 40 records image data imaged by camera 10 and sound data picked up by microphone array 20 in association with each other.

PC 50 as an example of the abnormal sound detection device is provided in monitoring room 75 where observer 77 resides, and includes signal processing unit 51, memory 52, operation unit 53, and playback unit 60. PC 50 performs a monitoring process for a sound pickup area using the image imaged by cameras 10 and 10A and the sound picked up by microphone array 20.

Signal processing unit 51 is configured by using, for example, a central processing unit (CPU), a micro processing unit (MPU), or a digital signal processor (DSP), and performs a control process for overall control over the operation of each unit of PC 50, a data input and output process between respective units, a data operation (calculation) process, and a data storage process.

Signal processing unit 51 as an example of the directivity formation unit adds respective sound data items picked up by respective microphones by a directivity control process of sound data, by using sound data directly transferred from microphone array 20 or recorded in recorder 40, and generates sound data of which directivity in a specific direction is formed, in order to emphasize (amplify) sound (for example, a sound volume level) in the specific direction designated by observer 77 from the position of each microphone 22 of microphone array 20. A technique related to a directivity control process of sound data for forming the directivity of the sound picked up by microphone array 20 is disclosed in, for example, Japanese Unexamined Patent Publication No. 2014-143678.

In other words, signal processing unit 51 generates sound data of which the directivity in the specific direction is formed to emphasize (amplify) the sound volume level of sound in a specific direction (directivity direction) from microphone array 20, by using sound data transmitted from microphone array 20. Further, the specific direction is a direction from microphone array 20 to a position corresponding to a predetermined designated position specified through operation unit 53 of observer 77, and a direction specified by the user including observer 77 to emphasize (amplify) the sound volume level of the sound data.

Signal processing unit 51 performs a conversion process of the coordinate system of the image data imaged by the omnidirectional camera (for example, two-dimensional or three-dimensional coordinate conversion of an x-axis, a y-axis, and a z-axis), and displays the converted data on display 63. In the case of displaying image data on display 63, there are three methods of displaying image data such as a circular image, a rectangular image, and a panoramic image. Although each display method will be described later, a case of using a panoramic image is described here, for the sake of easy understanding.

Operation unit 53 is disposed, for example, in correspondence with the screen of display 63, and is configured by using a touch panel or a touch pad on which an input operation is possible by a user's finger or a stylus pen. Operation unit 53 outputs, to signal processing unit 51, data of coordinates of one or more designated places that are desired to emphasize (amplify) the sound volume level of the sound data in response to the user's operation. In addition, operation unit 53 may be configured by using a pointing device such as a mouse or a keyboard.

Playback unit 60 is configured to include display 63 and speaker 65, displays on display 63, image data transmitted from camera 10 or recorded in recorder 40, and outputs sound based on sound data transmitted from microphone array 20 or recorded in recorder 40 to speaker 65. In addition, display 63 and speaker 65 may be configured separately from playback unit 60.

Display 63 as an example of a display unit displays image data imaged by camera 10 and transferred through network 25 or recorded on recorder 40. Speaker 65 as an example of a sound output unit outputs sound based on sound data which is picked up by microphone array 20 and transferred through network 25, or recorded on recorder 40, or sound data after the directivity is formed by signal processing unit 51 based on the sound data (in other words, sound data subjected to an emphasis process in a specific direction).

Memory 52, an example of the storage unit, is configured by using a nonvolatile memory that stores various data items and a storage medium including a volatile memory, and stores data such as list 31 of designated ranges other than a detection target (see FIG. 2A), and list 32 of sound types other than a detection target (see FIG. 2B) to be described later.

FIG. 2A is a diagram showing an example of registration contents of list 31 of designated ranges other than a detection target. FIG. 2B is a diagram showing an example of registration contents of list 32 of sound types other than a detection target. A set range, a sound other than a detection target, and a remarks column are registered for each number indicating the record in the list 31 of designated ranges other than a detection target illustrated in FIG. 2A. For example, the sound other than a detection target of set ranges B1 and C1 is registered as "water sound" in the record of the number L1. Further, the sound other than a detection target of set ranges B6 and C6 is registered as "all sounds" in the record of the number L2. A method of designating the range will be described later.

Further, a plurality of types of sounds other than a detection target are registered in list 32 of sound types other than a detection target illustrated in FIG. 2B. For example, "water sound", "explosion sound", "all sounds", "scream", or the like are registered as types of sounds other than a detection target. These sounds can be arbitrarily set as sounds other than a detection target as described later.

Next, the operation of abnormal sound detection system 5 having the above configuration will be described in detail.

Figure 3:
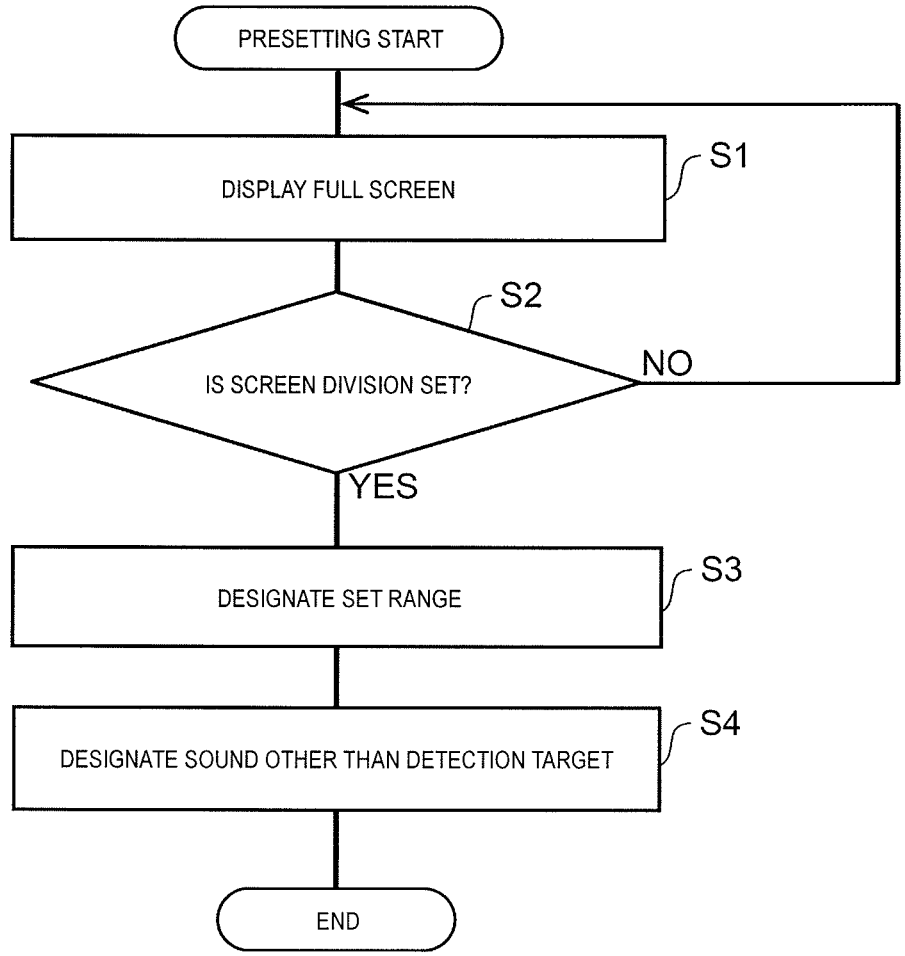
FIG. 3 is a flowchart illustrating an example of a presetting procedure by a PC.

FIG. 3 is a flowchart illustrating an example of a presetting procedure by PC 50. In the presetting process, various settings are performed in response to the input operation by the user including observer 77. First, signal processing unit 51 displays an omnidirectional image imaged by camera 10 on display 63 (S1).

In a case where signal processing unit 51 displays the omnidirectional image on the screen of display 63, for example, there are three types of methods. As described above, since camera 10 is an omnidirectional camera equipped with a fisheye lens on the front surface, in a case where a special correction process is not performed, the imaged image is a circular image.

In a first display method, signal processing unit 51 displays and outputs the omnidirectional image imaged by camera 10 as it is. In this case, since the omnidirectional image is a circular image, as a distance from the imaging center increases, an image becomes distorted.

In a second display method, signal processing unit 51 cuts out a fan-shaped partial image from the center of a circular image, performs predetermined distortion correction on the fan-shaped partial image, and displays a rectangular image.

In a third display method, signal processing unit 51 performs a predetermined panorama conversion on the circular image and displays a panoramic image as a full view image. As described above, in Exemplary Embodiment 1, a case where a panoramic image is displayed is described.

Figure 4:
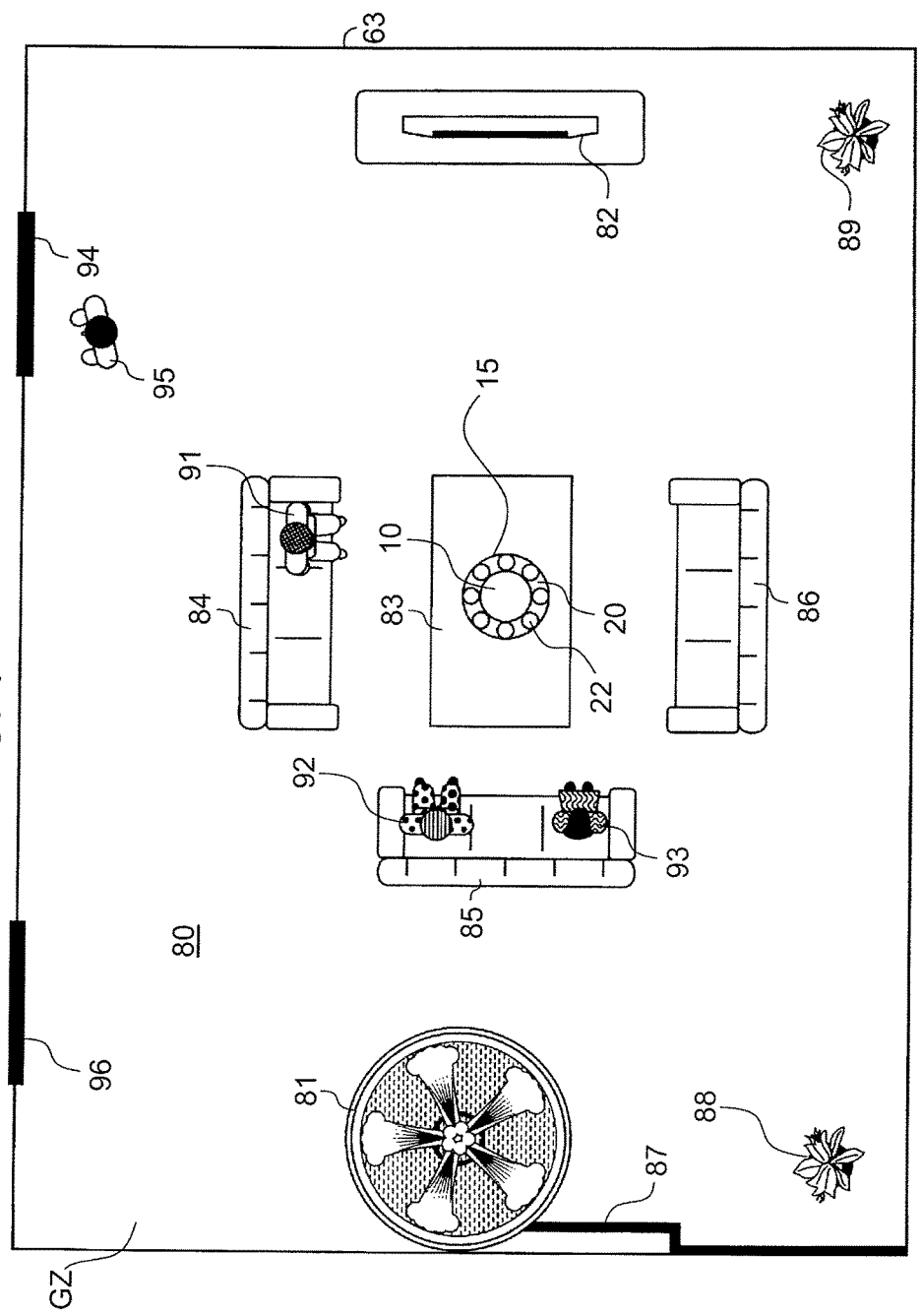
FIG. 4 is a diagram showing a screen of a display on which a panoramic image is displayed.

FIG. 4 is a diagram showing a screen of display 63 on which panoramic image GZ is displayed. On the screen of display 63, panoramic image GZ obtained in a case where camera 10 provided on the ceiling of a hotel lobby performs imaging directly downward is displayed. Monitoring unit 15 in which camera 10 and microphone array 20 are integrated may be displayed substantially at the center of the screen of display 63 so as to overlap with panoramic image GZ.

Further, table 83, three pairs of sofas 84, 85, and 86, person 91 sitting on sofa 84, and two people 92 and 93 sitting on sofa 85 are shown substantially at the center of panoramic image GZ. Fountain 81, water pipe 87, and flower arrangement 88 are shown on the left side of panoramic image GZ. TV 82 and flower arrangement 89 are shown on the right side of panoramic image GZ. Doors 94 and 96, and person 95 located near door 94 are shown on the upper side of panoramic image GZ.

Signal processing unit 51 determines whether or not screen division is set for panoramic image GZ displayed on display 63 (S2). That is, signal processing unit 51 determines whether or not the setting of screen division is received by an input operation on operation unit 53 of the user (for example, observer 77). As a method of setting of screen division, there is a method of dividing a screen by the user selecting a pre-registered dividing format.

Figure 5:
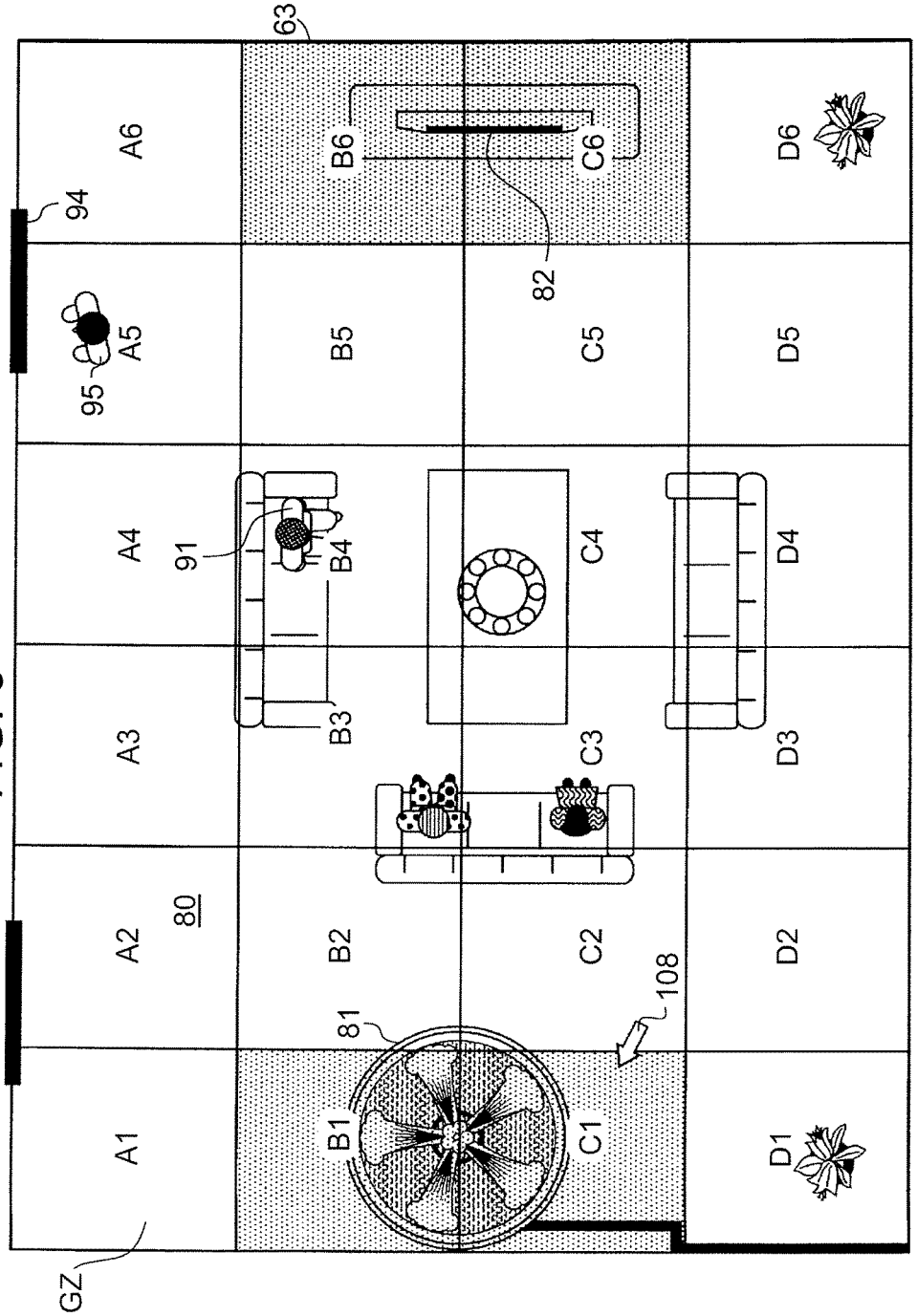
FIG. 5 is a diagram illustrating screen division which is performed on the panoramic image and designation of a set range.

FIG. 5 is a diagram illustrating screen division which is performed on panoramic image GZ and designation of a set range. For example, FIG. 5 shows a case where the screen of display 63 displaying panoramic image GZ is divided into 4×6 squares. In a case of division into 4×6 squares, 24 abnormal sound detection areas are set in target area 80 (here, a hotel lobby). In FIG. 5, set ranges A1 to D6 are set. That is, individual set ranges A1 to D6, set for panoramic image GZ, correspond to an abnormal sound detection area which is a part of target area 80. In addition, the form of screen division is not limited to the example of 4×6 squares shown in FIG. 5, and a screen may be divided into 4×4 squares, 8×4 squares, or the like, or divided into rhombuses or triangles, instead of rectangles such as squares. Hereinafter, individual ranges obtained by dividing a screen so as to be partitioned into a predetermined shape are referred to as "set ranges".

In a case where screen division is not set (NO in S2), signal processing unit 51 returns to step S1 and continues to display panoramic image GZ on the screen of display 63. On the other hand, if the setting of screen division is completed (YES in S2), signal processing unit 51 designates a set range corresponding to a specific abnormality detection area (for example, an area in which a fountain or a television is located) of a plurality of abnormality detection areas, from among all set ranges (S3).

There are several methods of specifying the set range. For example, as illustrated in FIG. 5, identification numbers (here, A1, . . . , and D6) are assigned to individual set ranges obtained by previously dividing a screen, and a desired set range is designated by the user inputting the identification number corresponding to the desired set range from operation unit 53 (for example, a keyboard). A desired set range can be set by selecting set ranges one by one with cursor 108, from among all set ranges displayed so as to overlap panoramic image GZ on the screen of display 63. The designated set range is displayed in a display form (for example, reverse display, dot display) that can be distinguished from other set ranges. In FIG. 5, the designated set ranges B1, C1, B6, and C6 are shown in shading.

Figure 6:
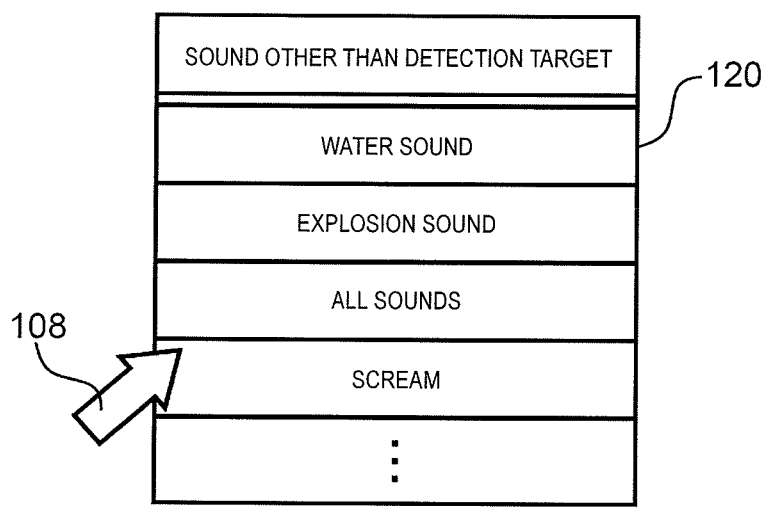
FIG. 6 is a diagram showing a pop-up screen for designating sound other than a detection target.

Signal processing unit 51 designates a sound other than a detection target, for the selection range designated in step S3 (S4). In the designation of a sound other than a detection target, for example, pop-up screen 120 (see FIG. 6) representing a list of sounds other than a detection target is displayed on display 63, and the user selects a sound other than a detection target one by one with cursor 108 so as to designate a sound other than a detection target. FIG. 6 is a diagram illustrating pop-up screen 120 for designating a sound other than a detection target. Sounds other than a detection target, which are listed in list 32 of sound types other than a detection target shown in FIG. 2B, are displayed on pop-up screen 120 in a selectable manner, as sounds other than a detection target.

Specifically, the sounds other than detection targets are "water sound", "explosion sound", "all sounds", "scream", and the like. As shown in FIG. 2A, "water sound" is designated as a sound other than a detection target, for set ranges B1 and C1 corresponding to the abnormal sound detection area where fountain 81 is provided. Further, "all sounds" is designated as a sound other than the detection target, for set ranges B6 and C6 corresponding to the abnormal sound detection area where television 82 is provided. Thus, the presetting process in PC 50 is completed.

FIG. 7 is a flowchart illustrating an example of an abnormal sound detection process procedure by PC 50. The abnormal sound detection process is a process performed at the time of operation after the presetting is completed. At the time of operation, camera 10 images target area 80 in real time, transfers the imaged image as image data to PC 50, and records the imaged image in recorder 40. In addition, microphone array 20 picks up a sound from target area 80 in real time in synchronization with the imaging operation of camera 10, transfers the picked up sound to PC 50 as sound data, and further records the picked up sound in recorder 40.

Signal processing unit 51 displays panoramic image GZ of target area 80 on the screen of display 63, based on the imaging data transferred from camera 10 (S11). Signal processing unit 51 waits until one of the set ranges set by dividing panoramic image GZ (S12). The designation of a set range may be performed, for example, by signal processing unit 51 automatically selecting one from all the set ranges in order, or may be performed by the user arbitrarily selecting a set range.

If the set range is designated in step S12 (YES in S12), signal processing unit 51 performs the directivity control process of the aforementioned sound data in order to emphasize the sound of the designated set range from the sound of the entire target area picked up by microphone array 20, forms sound directivity in the designated direction, and outputs sound in the designated direction (S13).

Signal processing unit 51 determines whether or not an abnormal sound is generated based on the sound output in step S13 (S14). In the determination of an abnormal sound, for example, at least one of the sound volume and the frequency characteristic is used. That is, in a case where a sound has a sound volume exceeding a preset threshold, the output sound is determined as an abnormal sound. Further, in a case where the frequency characteristic of a sound satisfies a predetermined condition, for example, the frequency characteristic of the sound is analyzed. In a case where the center frequency and its distribution are included in a specific frequency range, the output sound is determined as an abnormal sound, and further the type thereof is specified. Here, the output sound is determined as an abnormal sound, and furthermore, the type is specified. In addition, both the sound volume and the frequency characteristic may be used.

In a case where an abnormal sound is not generated in step S14 (NO in S14), signal processing unit 51 designates the next set range (S15). As described above, in a case where the user does not specifically designate a set range, signal processing unit 51 designates the next set range according to the aforementioned order. Then, signal processing unit 51 returns to the process of step S13.

On the other hand, in a case where an abnormal sound is generated in step S14 (YES in S14), signal processing unit 51 determines whether or not the designated set range is a range in which the abnormal sound is to be detected, that is, a set range that does not correspond to list 31 of designated ranges other than a detection target illustrated in FIG. 2A (S16). For example, in a case where the designated set range is "B1" and the type of an abnormal sound is "water sound", it is determined that the designated range is not a range in which the abnormal sound is to be detected.

In a case where it is determined in step S16 that the designated range is not a range in which the abnormal sound is to be detected (NO in S16), signal processing unit 51 determines that an alert notification is not performed (alert OFF) (S17) and designates the next set range (S18). As described above, in a case where the user does not specifically designate a set range, signal processing unit 51 designates the next set range according to the aforementioned order (S18). Then, signal processing unit 51 returns to the process of step S13.

On the other hand, in a case where it is determined in step S16 that the designated range is a range in which the abnormal sound is to be detected (YES in S16), signal processing unit 51 performs alert notification (alert ON) (S19). For example, in a case where the designated range is "A5" and the type of an abnormal sound is "scream", it is determined that the designated range is a range in which the abnormal sound is to be detected, and alert notification is performed. In Exemplary Embodiment 1, as an alert notification, a warning sound is emitted from speaker 65, and an alarm message is displayed on the screen of display 63.

Figure 8A:
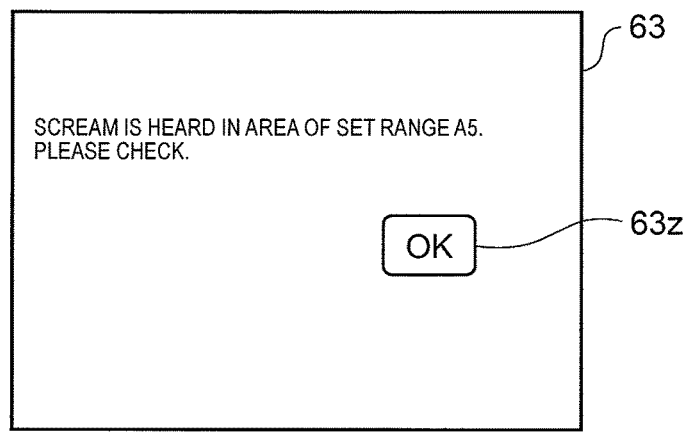
FIG. 8A is a diagram showing an alert notification screen displayed on the display.
Figure 8B:
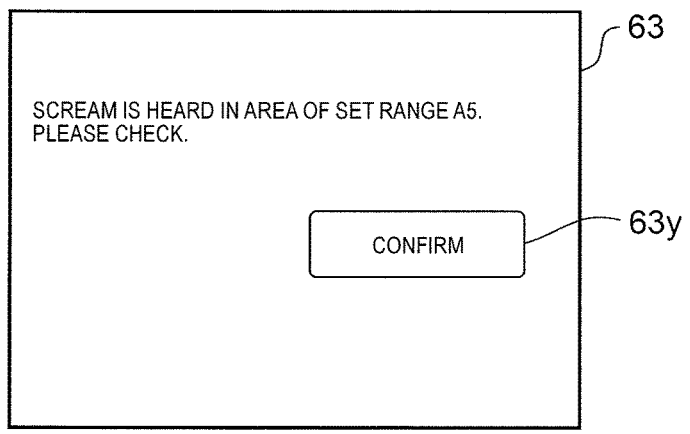
FIG. 8B is a diagram showing an alert notification screen displayed on the display.

FIG. 8A and FIG. 8B show alert notification screens displayed on display 63. On the alert notification screen shown in FIG. 8A, "A scream is heard in the area of set range A5. Please check." is displayed. Then, the user (for example, observer 77) checks the situation of the area of set range A5, and thereafter, if OK button 63z displayed on this screen is selected by the operation of a cursor, a specific key, or the like, the alarm message is erased.

Figure 8C:
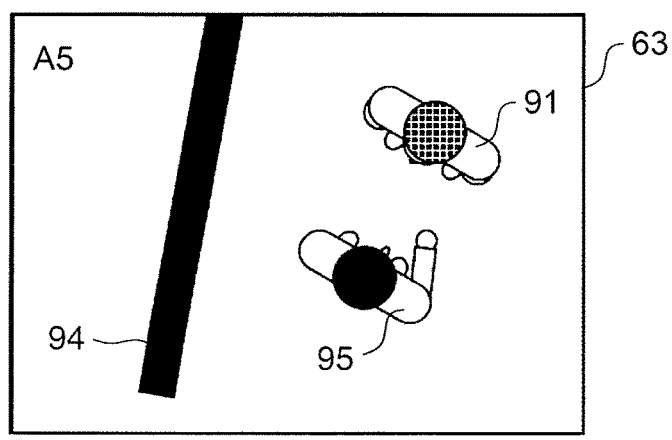
FIG. 8C is a diagram showing a screen of a display on which an imaged image of a set range having detected abnormal sound is displayed.

Confirmation button 63y is displayed together with the alarm message similar to FIG. 8A, on the alert notification screen shown in FIG. 8B. If the user (for example, observer 77) presses confirmation button 63y, the image of set range A5, which is imaged by camera 10 and in which the abnormal sound is detected, is displayed on the full screen of display 63. FIG. 8C is a diagram showing a screen of display 63 on which an imaged image of a set range having detected abnormal sound is displayed. Here, the situation in which door 94 is opened and person 95 and another person 91 are in trouble in set range A5 is displayed on the screen of display 63. In addition, the user can select which one of the alert notification screen shown in FIG. 8A and the alert notification screen shown in FIG. 8B is to be displayed on display 63.

Thus, in the abnormal sound detection system 5 of Exemplary Embodiment 1, by registering a set range and a sound type which are not subject to detection of an abnormal sound in advance, even if an abnormal sound is detected in target area 80 like the hotel lobby, the sound flowing from television 82 provided there and the water sound or the like emitted from fountain 81 are not erroneously detected as abnormal sounds. That is, PC 50 performs an alert notification in a case of detecting a sound which is regarded as an abnormal sound, and PC 50 does not perform an alert notification in a case of detecting a sound which is not regarded as an abnormal sound. Thus, it is possible to clearly distinguish between a sound that is regarded as an abnormal sound and a sound that is not, and it is possible to suppress degradation of convenience at the time of monitoring by a user (for example, observer 77).

Figure 9:
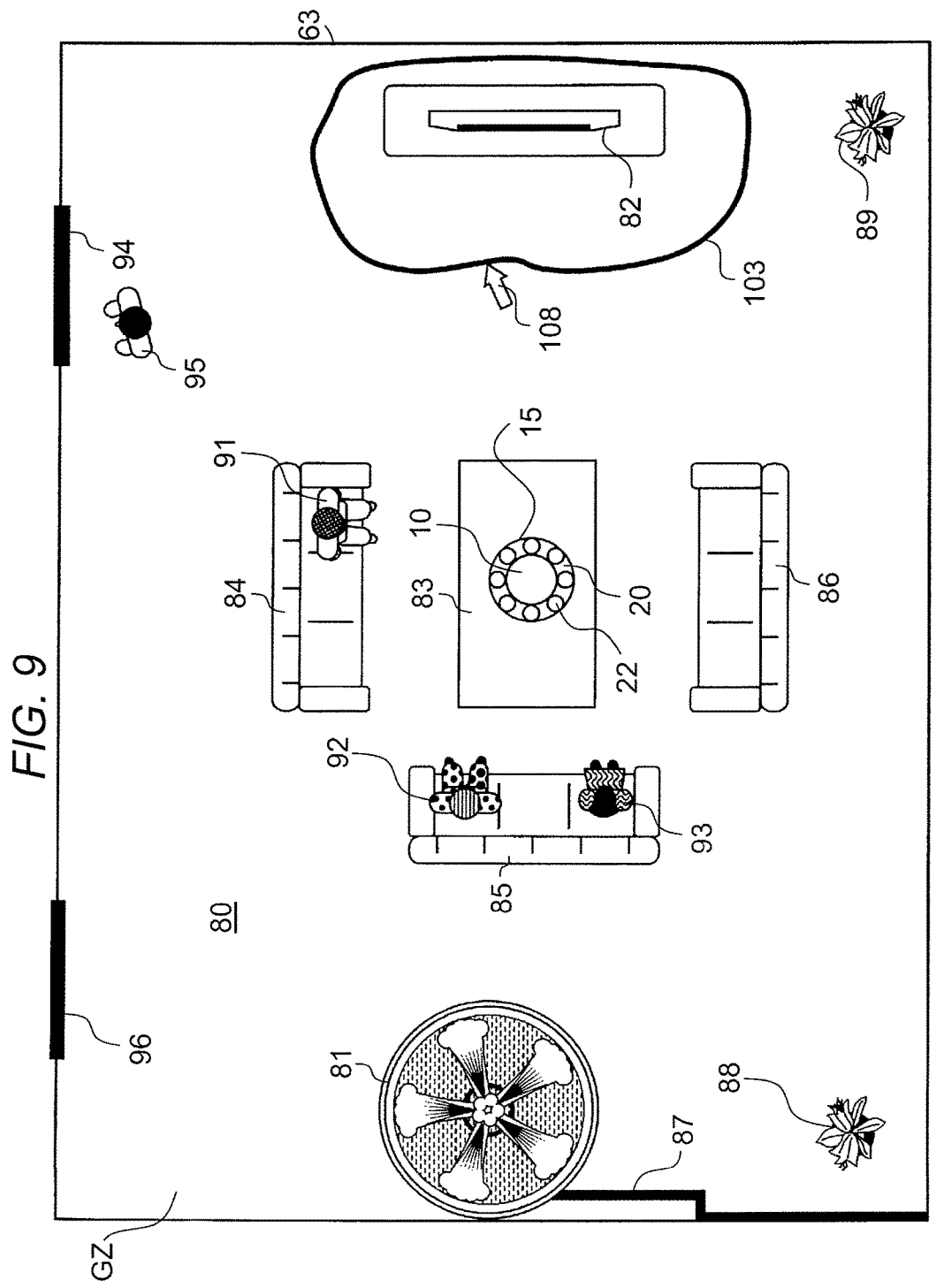
FIG. 9 is a diagram showing a set range designated by drawing a predetermined shape.

The abnormal sound detection area is an area having a predetermined shape, and a plurality of abnormal sound detection areas may be set by dividing the sound pickup area which is a pickup target of the sound pickup device into a predetermined shape. For example, in Exemplary Embodiment 1, a set range is designated by selecting one of a plurality of set ranges obtained by dividing the screen, but a set range may be designated without dividing the screen. As an example, a set range may be designated by the user drawing a predetermined shape according to the user's preference on the image of the target area displayed on the screen of display 63. FIG. 9 is a diagram showing a set range designated by drawing a predetermined shape. The user may designate a set range by moving cursor 108, or by drawing a closed curve with a stylus pen, on the screen of display 63. In FIG. 9, closed curve 103 is drawn so as to surround television 82. In this way, since an area drawn by a predetermined input operation by the user is handled as an abnormal sound detection area, the user can arbitrarily determine the shape and size of the area and appropriately designate a set range. This increases the degree of freedom of designating a set range, and improves operability.

Further, in Exemplary Embodiment 1, if an abnormal sound is generated, the type of the abnormal sound is specified at first, and thereafter, it is determined whether or not a generation source is a set range in which the abnormal sound is to be detected. However, the generation location (set range) of an abnormal sound may be specified at first, and in a case where the generation location is listed on the list of designated ranges other than a detection target, it may be subsequently determined whether or not the type of the abnormal sound is a sound other than a detection target. Thus, in a case where the generation location of an abnormal sound is not within the set range in which the abnormal sound is to be detected, the process of specifying the type of the abnormal sound can be omitted, and the load of the process performed by PC 50 can be reduced.

Further, in Exemplary Embodiment 1, abnormal sound detection system 5 makes an alarm sound and displays an alarm message in a case of performing alert notification, but may also transmit an email to a mobile terminal possessed by the user including observer 77, at a time when an abnormal sound (for example, a split sound of glass) is detected or after the lapse of a predetermined time, or may also turn on the alarm lamp provided in monitoring room 75. Further, abnormal sound detection system 5 may store in memory 52 of PC 50 that the detection of the abnormal sound is notified to an external terminal (for example, a mobile terminal possessed by the user including observer 77). Thus, abnormal sound detection system 5 can take measures against third party illegal entry into the sound pickup area. Further, instead of a warning sound, a specific melody tone may be made to flow so as not to cause a third person to be conscious of the warning.

Further, in Exemplary Embodiment 1, the case is described where PC 50 monitors an image imaged by camera 10 in real time and a sound picked up from microphone array 20 in synchronization with camera 10, and the abnormal sound detection operation may also be similarly performed in the case where the image data and sound data, recorded in recorder 40, are analyzed later. In this case, since it is not determined as an abnormal sound in the set range in which the abnormal sound is not to be detected, it is possible to immediately analyze the recorded image data and sound data.

Exemplary Embodiment 2

Hereinafter, an exemplary embodiment which specifically discloses a directivity control system and a directivity control method according to the present disclosure (hereinafter, referred to as "Exemplary Embodiment 2") will be described with reference to the drawings. The directivity control system of Exemplary Embodiment 2 is applied to, for example, a monitoring system and a security system using both a camera and a microphone array. The directivity control system of Exemplary Embodiment 2 can also be applied to the case where an abnormal sound is detected in the abnormal sound detection system of Exemplary Embodiment 1.

Figure 10:
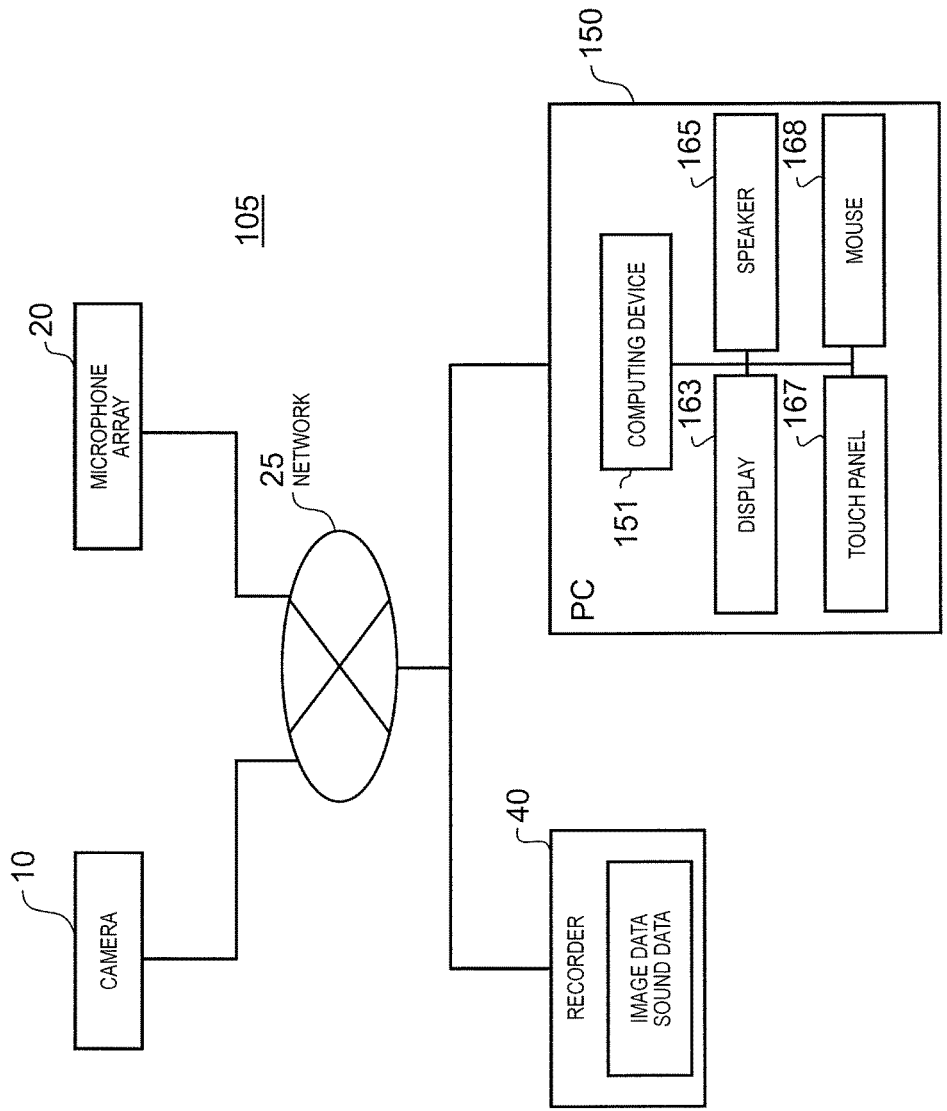
FIG. 10 is a block diagram showing an example of a system configuration of a directivity control system of Exemplary Embodiment 2.

FIG. 10 is a block diagram showing an example of a system configuration of directivity control system 105 of Exemplary Embodiment 2. Directivity control system 105 shown in FIG. 10 has a configuration in which camera 10, microphone array 20, recorder 40, and personal computer (PC) 150 are connected with each other through network 25. Exemplary Embodiment 2 is similar to Exemplary Embodiment 1 in terms of including camera 10, microphone array 20, recorder 40, and network 25.

Directivity control system 105 may acquire image data of the image imaged by camera 10 and sound data of sound picked up by microphone array 20 in real time, or may acquire again image data and sound data which are imaged and picked up in advance and recorded in recorder 40. Incidentally, recorder 40 may be included in directivity control system 105 or may not be included therein.

Microphone array 20 as an example of the sound pickup device is provided on, for example, a ceiling of a hotel lobby which is a sound pickup area (target area), and includes a casing in which a plurality of microphones 122 (see FIG. 13(A)) are provided uniformly. Microphone array 20 picks up the sound around the monitoring target point (place) using each microphone 122, transmits the sound data of the sound picked up by each microphone 122 to PC 150 through network 25 in real time, and transmits the sound data to recorder 40.

Each microphone mounted on microphone array 20 may be an omnidirectional microphone, a bidirectional microphone, a unidirectional microphone, an acute directional microphone, a super directional microphone (for example, a gun microphone) or a combination thereof.

Similar to microphone array 20, camera 10 as an example of the imaging device is, for example, an omnidirectional camera provided on the ceiling of the hotel lobby and capable of imaging omnidirectional images by being equipped with a fisheye lens on the front surface, and images surrounding images (including still images and moving images). Camera 10 transmits the imaged image data to PC 150 and recorder 40 through network 25. In addition, camera 10 may be a PTZ camera having a pan tilt function, a zoom-in function and a zoom-out function (hereinafter referred to as a pan tilt zoom (PTZ) function) that can be operated remotely at PC 150, or may be a fixed camera with a fixed angle of view.

For example, PC 150 is provided in a monitoring room or the like, and includes computing device 151, display 163, speaker 165, touch panel 167, and mouse 168. PC 150 outputs sounds picked up by microphone array 20 from speaker 165, and displays an image imaged by camera 10 on display 163.

Computing device 151 is configured by using, for example, a central processing unit (CPU), a micro processing unit (MPU), or a digital signal processor (DSP), and performs a control process for overall control over the operation of each unit of PC 150, a data input and output process between respective units, a data operation (calculation) process, and a data storage process.

Computing device 151 as an example of the directivity formation unit adds respective sound data items picked up by respective microphones 122 (see FIG. 13(A)) by a directivity control process of sound data, by using sound data directly transferred from microphone array 20 or recorded in recorder 40, and generates sound data of which directivity in a specific direction is formed, in order to emphasize (amplify) sound (a sound volume level) in the specific direction from the position of each microphone 122 of microphone array 20. The specific direction is a direction from microphone array 20 to an actual sound position (sound source) corresponding to a certain designated position on the image displayed on display 163 designated by mouse 168 or the like, and a direction designated by the user to emphasize (amplify) the sound volume level of the sound data. A technique related to a directivity control process of sound data for forming the directivity of the sound picked up by microphone array 20 is disclosed in, for example, Japanese Unexamined Patent Publication No. 2014-143678.

Computing device 151 performs a conversion process of the coordinate system of the image data (omnidirectional image) imaged by camera 10 which is an omnidirectional camera (for example, two-dimensional or three-dimensional coordinate conversion of an x-axis, a y-axis, and a z-axis), and displays the data which is converted to a two-dimensional panoramic image, on display 163.

Mouse 168 as an example of the operation unit is operated by the user, receives a designation operation for the designated position (specifically, coordinate data on the image displayed on display 163) in which the sound volume level of sound data is emphasized, and outputs the designation operation to computing device 151. In addition, with respect to an image of the sound pickup area (target area) displayed on display 163, mouse 168 is used to perform an input operation (for example, zoom-in, zoom-out, and drag (scroll) operations) for switching the image. Instead of a mouse, a pointing device such as a keyboard or a trackball may be used.

Display 163 as an example of the display unit displays image data and the like captured by camera 10. Touch panel 167 has a structure in which display elements of information or data and detection elements of an input operation are superimposed, and can detect a user's input operation (for example, a touch operation) on the displayed image. Touch panel 167 may be used to realize the functions of display 163 and mouse 168 described above. In this case, touch panel 167 can directly detect a touch operation performed while the user views the image displayed on display 163, which improves the operability of the user.

Speaker 165 as an example of the sound output unit outputs sound based on sound data which is picked up by microphone array 20 and transferred through network 25, or sound data recorded on recorder 40, or sound data subjected to an emphasis process in a specific direction by computing device 151 based on the sound data.

Recorder 40 has a configuration including a control unit for controlling each process such as data recording, and a recording unit for storing image data and sound data, and records the image data imaged by camera 10, which is transferred through network 25, and the sound data picked up by microphone array 20.

Figure 11A:
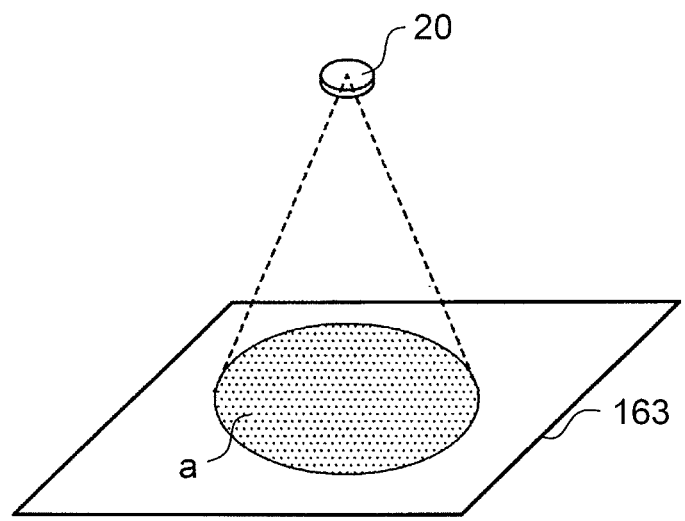
FIG. 11A is a diagram illustrating a range in which directivity of sound picked up by a microphone array is formed for the screen of the display.
Figure 11B:
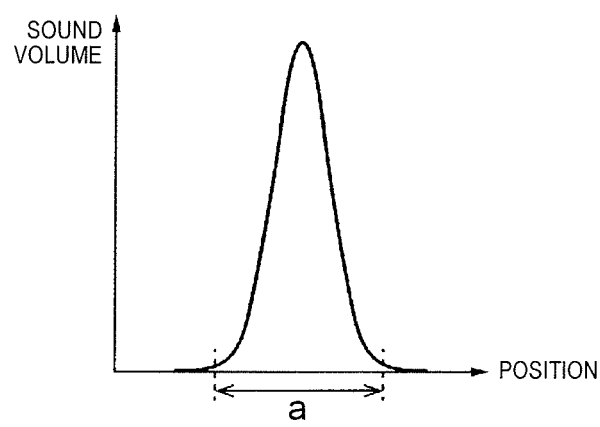
FIG. 11B is a graph showing a Gaussian distribution indicating a range in which directivity of sound is formed.

FIG. 11A is a diagram illustrating a range in which the directivity of a sound picked up by microphone array 20 is formed for the screen of display 163. In Exemplary Embodiment 2, in a case where an image displayed on display 163 is switched by, for example, any one of zoom-in, zoom-out, and drag operations, computing device 151 generates the directivity of a sound in a directivity direction corresponding to the center position of the image displayed on display 163 after switching. In this case, as shown in the graph of FIG. 11B, the range (hereinafter, referred to as "sound directivity range") in which the directivity of a sound is formed in the image displayed on display 163 is represented by a Gaussian distribution with the center position of the image displayed on display 163 as the peak position. FIG. 11B is a graph showing a Gaussian distribution indicating a range in which the directivity of a sound is formed.

For example, it is assumed that an area from the peak value of the sound volume to the value of 5% lower than the peak value is sound directivity range a. Even when the image displayed on display 163 is switched by zoom-in or zoom-out, the size of sound directivity range a is fixed, such that if the image is enlarged by zoom-in, sound directivity range a also increases, and on the other hand, if the image is reduced by zoom-out, sound directivity range a also decreases (see FIG. 13(B) and FIG. 13(C)).

In the description of FIG. 11A, in order to simplify the description, a case is described in which the directivity of a sound is formed in the directivity direction corresponding to the center position of the screen of display 163 (in other words, the image displayed on display 163) in response to any one of zoom-in, zoom-out, drag operations. However, as described above, in a case where a certain position on the image displayed on display 163 is designated by the user, the directivity of a sound is formed in the direction (directivity direction) toward the actual sound position (sound source) corresponding to the designated position on the image, from microphone array 20.

Next, the operation of directivity control system 105 with the above configuration will be described with reference to FIG. 12.

FIG. 12 is a flowchart illustrating an example of a forming operation procedure of directivity in a case where a zoom operation or a drag operation is performed in directivity control system 105 of Exemplary Embodiment 2. First, computing device 151 displays the image of the entire sound pickup area (target area) imaged by camera 10 on display 163, and outputs the sound picked up by microphone array 20 omnidirectionally from speaker 165 (S21).

Computing device 151 determines whether or not the zoom operation using mouse 168 is performed by the user (S22). In a case where the zoom operation is not performed, the process of computing device 151 returns to step S21. On the other hand, in a case where the zoom operation is performed in step S22, computing device 151 enlarges or reduces the image displayed on display 163 in response to the zoom operation, and forms the directivity of a sound in the direction corresponding to the center position of the image displayed on display 163 (S23). Thus, the sound emitted from the center of the image which is enlarged or reduced and displayed on the screen of display 163 is emphasized.

Computing device 151 determines whether or not a zoom operation or a drag operation (scroll operation) using mouse 168 is performed by the user (S24). In a case where the zoom-in operation is performed, the process of computing device 151 returns to step S23, and the process of step S23 is executed again. On the other hand, in a case where the zoom-out operation is performed, computing device 151 determines whether or not a full screen is displayed as a result of the zoom-out operation (S25). In a case where the full screen is not displayed, the process of computing device 151 returns to step S23, and the process of step S23 is executed. In a case where the full screen is displayed in step S25, the process of computing device 151 returns to step S21.

On the other hand, in a case where the drag operation is performed in step S24, computing device 151 switches the image displayed on display 163 in the drag direction, and forms the directivity of a sound in the direction corresponding to the center position of the image displayed on the switched screen (S26). Thereafter, the process of computing device 151 returns to step S24.

Figure 13:
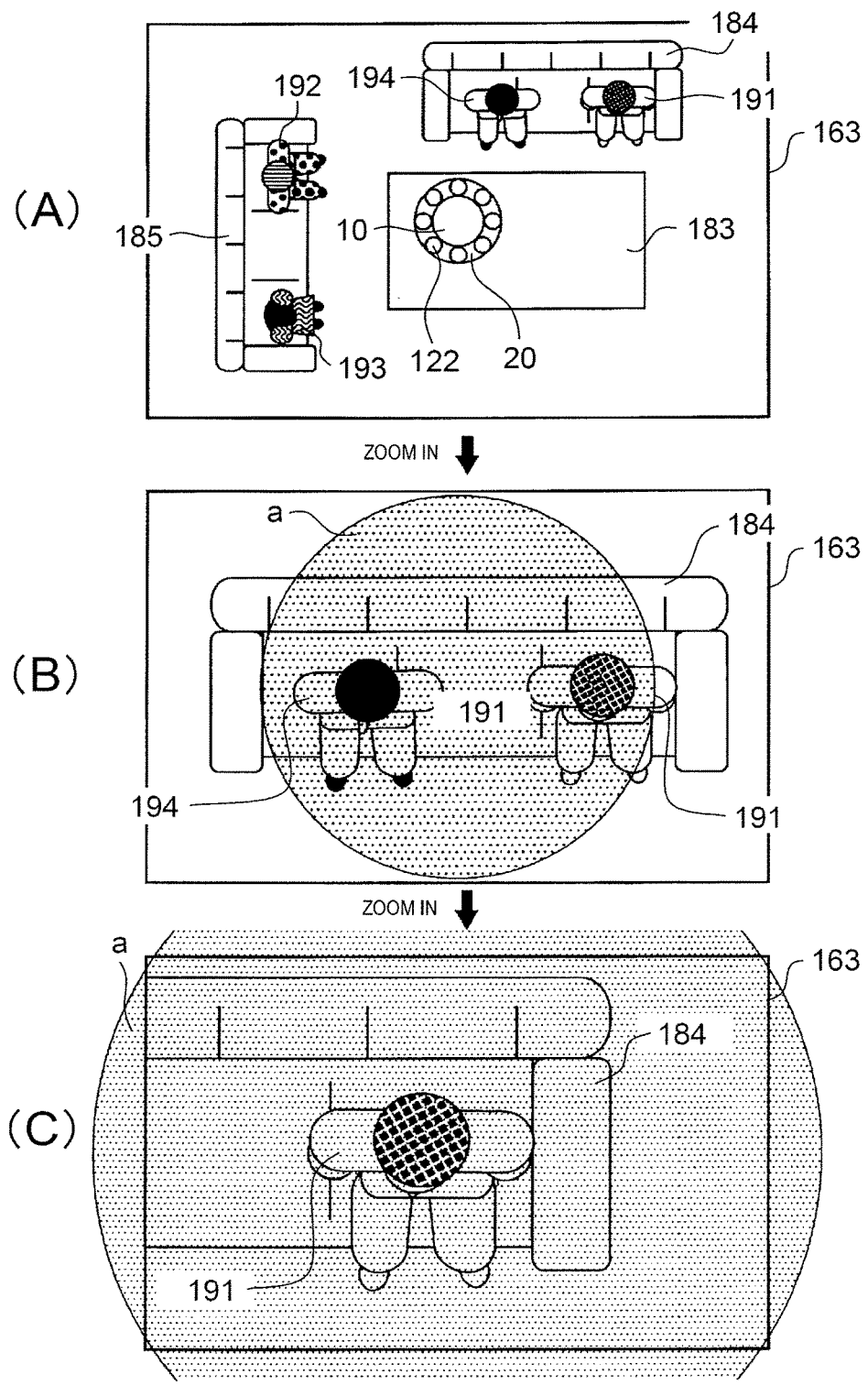
FIG. 13 is a diagram illustrating in (A)-(C) the image displayed on the screen of the display and a directivity range of a sound, which vary depending on an input operation by a user using a mouse.

FIG. 13 and FIG. 14 each are a diagram illustrating the image displayed on the screen of display 163 and sound directivity range a, which vary depending on an input operation using mouse 168 by a user. A hotel lobby which is the sound pickup area (target area) imaged by camera 10 is displayed on the screen of display 163 in the initial state shown in FIG. 13(A). In this case, the sound picked up by microphone array 20 is output from speaker 165 omnidirectionally.

For example, if the user performs the zoom-in operation around person 191 and 194 by using mouse 168, as shown in FIG. 13(B), the image displayed on the screen of display 163 is switched. The image of the vicinity of sofa 184 is enlarged and displayed on the switched screen. In addition, the directivity of a sound is formed in the direction corresponding to the center position of the image displayed on the switched screen, and sound directivity range a is set substantially at the center of sofa 184. In this case, the conversation between person 191 and person 194 sitting on sofa 184 is subjected to an emphasis process by computing device 151 and output from speaker 165.

Further, if the user performs the zoom-in operation around person 191 by using mouse 168, as shown in FIG. 13(C), the image displayed on the screen of display 163 is switched. The image of person 191 sitting on the right side of sofa 184 is enlarged and displayed on the switched screen. In addition, a new directivity of a sound is formed in the direction corresponding to the center position of the image displayed on the switched screen, and sound directivity range a is set so as to cover person 191. In this case, the speaking voice of person 191 is subjected to an emphasis process by computing device 151 and output from speaker 165.

In this case, sound directivity range a does not fit within the screen of display 163, and spreads beyond the display area (display frame) of the screen. In other words, the sound emitted from the position corresponding to the outside of the screen frame is output from the speaker 165 while the sound volume thereof is reduced. Therefore, the voice of person 194 sitting next to person 191 is also output as a small sound. In a case where the user is concerned about the voice of next-sitting person 194 in this state, if the drag operation is performed so as to match sound directivity range a to person 194 using mouse 168, the voice emitted by person 194 is subjected to an emphasis process by computing device 151, such that it is possible to clearly hear the voice.

That is, as shown in FIG. 13(C), even if the voice of person 194 is heard in a case where person 191 is zoomed in, person 194 is not displayed on the screen, such that it is not possible to form the directivity of a sound for person 194 in this state. Therefore, in Exemplary Embodiment 2, computing device 151 can make the directivity of a sound direct person 194, only by the user dragging the screen in the direction of person 194, in the screen shown in FIG. 13(C) as it is (in other words, it is not necessary to perform the zoom-out operation from the screen shown in FIG. 13(C) to the screen shown in FIG. 13(B)).

Furthermore, when the user performs drag operation using mouse 168 on the screen shown in FIG. 13(C), the image displayed on the screen of display 163 is switched, as shown in FIG. 14(A). The image of person 192 sitting on sofa 185 is enlarged and displayed on the switched screen. In addition, a new directivity of a sound is formed in the direction corresponding to the center position of the image displayed on the switched screen, and sound directivity range a is set so as to cover person 192. In this case, the speaking voice of person 192 is subjected to an emphasis process by computing device 151 and output from speaker 165. Further, sound directivity range a does not fit within the screen of display 163, and spreads beyond the display range (display frame) of the screen. In other words, the sound emitted from the position corresponding to the outside of the screen frame is output from the speaker 165 while the sound volume thereof is reduced.

Further, if the user performs the zoom-out operation by using mouse 168, as shown in FIG. 14(B), the image displayed on the screen of display 163 is switched. The image of the vicinity of sofa 185 is reduced and displayed on the switched screen. In addition, a new directivity of a sound is formed in the direction corresponding to the center position of the image displayed on the switched screen, and sound directivity range a is set substantially at the center of sofa 185 so as to fit within the screen. In this case, the conversation between person 192 and person 193 sitting on sofa 185 is subjected to an emphasis process by computing device 151 and output from speaker 165.

Thus, directivity control system 105 of Exemplary Embodiment 2 associates the imaged image from camera 10 displayed on display 163 and a position where the directivity of the sound picked up by microphone array 20 at the sound pickup area is formed (sound directivity range a) with each other. Thus, PC 150 can perform matching such that the image displayed on the screen of display 163 corresponds one-to-one with the position where a sound is to be emphasized.

Further, in directivity control system 105, since the user can switch the screen by a simple operation such as one of zoom-in, zoom-out, and drag operations on a desired position on the image which is targeted while watching the image displayed on the screen of display 163, PC 150 can simply form the directivity of a sound in a direction (a directivity direction) toward a position corresponding to a predetermined position (a center position) on the image displayed on the switched screen from microphone array 20, thereby allowing the user to smoothly switch the directivity range of the sound that the user wants to hear, by a simple operation.

In addition, directivity control system 105 can follow the center position in the directivity direction such that the directivity of a sound can be formed at the center position of the image displayed after being switched by any one of the zoom-in, zoom-out, and drag operations described above, by matching the substantially center position of the image displayed on display 163 and a position where a sound is emphasized. Further, directivity control system 105 can suppress sounds from positions other than the display range of sound directivity range a, by forming the directivity such that the center position in the directivity direction becomes the peak value of the directivity.

In addition, in Exemplary Embodiment 2, the directivity of a sound is formed in a direction corresponding to the center position (the center position on the image displayed on the screen) of the screen of display 163, but without being limited to the center position, the directivity of a sound may be formed in a direction corresponding to a certain position deviated from the center, or the directivity of a sound may be formed in a direction corresponding to, for example, the upper part, the lower part, the left part, and the right part, or the four corners of the screen. This improves the operability by the user.

Modification Example of Exemplary Embodiment 2

In Exemplary Embodiment 2, even if the screen is switched, the range in which the directivity of a sound is formed (the size of sound directivity range a) is constant. However, in a modification example of Exemplary Embodiment 2, a case is shown where the size of sound directivity range a is changed according to zoom magnification, if the screen is switched. The configuration of the directivity control system of the modification of Exemplary Embodiment 2 is the same as that of Exemplary Embodiment 2.

In the process of step S23 in the directivity forming operation shown in FIG. 12 described above, when enlarging or reducing the image displayed on the screen of display 163 in response to the zoom operation, computing device 151 changes sound directivity range a to a size corresponding to a zoom magnification.

FIG. 15 is a diagram illustrating an imaged image displayed on the screen of the display and the sound directivity range, in a case where sound directivity range a is changed to a size corresponding to a zoom magnification. FIG. 15(A) shows the screen of display 163 corresponding to FIG. 13(B), and FIG. 15(B) shows the screen of display 163 corresponding to FIG. 13(C). In a case where the zoom-in operation is performed such that the screen changes from FIG. 15(A) to FIG. 15(B), sound directivity range a is set to be narrow. That is, the larger the zoom magnification is, the narrower the sound directivity range a, which is the range centered on the sound pickup position, is changed.

As a result, as shown in FIG. 15(B), even if the image is enlarged and displayed, sound directivity range a does not protrude beyond the frame of the screen, and only the sound emitted from person 191 can be concentrated and picked up. That is, when the user desires to hear the sound emitted from a specific position on the image, if the image area including the position is enlarged and displayed, sound directivity range a is narrowed so as to include the position in conjunction with the enlarged display, so the user can concentrate and hear the sound from the enlarged image. As a result, monitoring capability using camera 10 and microphone array 20 is enhanced. In addition, it is possible to prevent the sound picked up in the area protruding from the screen from being played, so that the user can hear the picked up sound without any discomfort.

While exemplary embodiments have been described with reference to the drawings, it is to be understood that the present disclosure is not limited thereto. It is apparent to those skilled in the art that changes and modifications are conceivable within the scope described in the claims, and it would be appreciated that those naturally belong to the technical scope of the present disclosure.

For example, the abnormal sound detection device of the Exemplary Embodiment 1 may display an image of the abnormal sound detection area, which is imaged by the imaging device and a subject of the alert notification, on the display unit, in a case where a predetermined instruction operation for the alert notification is performed. Thus, since the abnormal sound detection system displays an image of the abnormal sound detection area, which is imaged by the imaging device and a subject of the alert notification, on the display unit, the user can check visually and easily the abnormal sound detection area from which the abnormal sound is detected, and recognize the situation immediately.

Further, for example, the abnormal sound detection device of Exemplary Embodiment 1 may set a plurality of abnormal sound detection areas by using the image of the sound pickup area imaged by the imaging device. Thus, since the abnormal sound detection system uses the image of the sound pickup area imaged by the imaging device when the user sets a plurality of abnormal sound detection areas, it is possible to simplify an operation for setting the plurality of abnormal sound detection areas.

Further, for example, in Exemplary Embodiment 2, a new directivity is formed when the screen is switched, but directivity may not be formed in a case where the screen is switched. For example, in the case of switching to the full screen display of the target area in step S24, the process returns to step S21, the control to form the directivity is not performed, and a sound is output omnidirectionally.

INDUSTRIAL APPLICABILITY

The present disclosure is useful as an abnormal sound detection system which clearly distinguishes a sound which should not be regarded as an abnormal sound when detecting the abnormal sound and improves the convenience of the user. Further, the present disclosure is useful as a directivity control system, a directivity control device, an abnormal sound detection system provided with either thereof, and a directivity control method, which associates a displayed image of a sound pickup area with a position where directivity of a sound picked up at the sound pickup area is formed, and follow and switch the position where directivity of a sound is formed according to switching of an image displayed on a display unit.

REFERENCE MARKS IN THE DRAWINGS

5 ABNORMAL SOUND DETECTION SYSTEM
10, 10A CAMERA
15 MONITORING UNIT
20 MICROPHONE ARRAY
25 NETWORK
31 LIST OF DESIGNATED RANGES OTHER THAN DETECTION TARGET
32 LIST OF SOUND TYPES OTHER THAN DETECTION TARGET
40 RECORDER
50 PC
51 SIGNAL PROCESSING UNIT
52 MEMORY
53 OPERATION UNIT
60 PLAYBACK UNIT
63 DISPLAY
63y CONFIRMATION BUTTON
63z OK BUTTON
65 SPEAKER
75 MONITORING ROOM
77 OBSERVER
80 TARGET AREA
81 FOUNTAIN
82 TELEVISION
84, 85, 86 SOFA
87 WATER PIPE
88, 89 FLOWER ARRANGEMENT
91, 92, 93, 95 PERSON
94, 96 DOOR
103 CLOSED CURVE
105 DIRECTIVITY CONTROL SYSTEM
108 CURSOR
120 POP-UP SCREEN
140 RECORDER
150 PC
151 COMPUTING DEVICE
163 DISPLAY
165 SPEAKER
167 TOUCH PANEL

168 MOUSE
183 TABLE
184, 185 SOFA
191, 192, 193, 194 PERSON
A1 to A6, B1 to B6, C1 to C6, D1 to D6 SET RANGE
GZ PANORAMIC IMAGE

The invention claimed is:

1. An abnormal sound detection system comprising:
a sound pickup device, including a microphone, that picks up a sound in the sound pickup area including a plurality of abnormal sound detection areas,
an imaging device that images the sound pickup area;
a display that displays an image of the sound pickup area which is imaged by the imaging device;
a processor that performs operations including:
receiving a switching operation to switch a display range of the sound pickup area displayed on the display; and
forming directivity for the sound picked up by the sound pickup device, in a direction toward an actual position corresponding to a designated position on the image of the sound pickup area displayed on the display, in response to the switching operation of the display range of the sound pickup area; and
a storage that stores an abnormality notification exclusion list in which each of the plurality of abnormal sound detection areas and an abnormal sound are associated with each other,
wherein the processor further performs operations including:
designating an abnormal sound detection area of the plurality of abnormal sound detection areas;
forming directivity for the sound picked up by the sound pickup device, in a direction toward the designated abnormal sound detection area;
determining whether or not an abnormal sound is detected in the sound for which the directivity is formed;
determining, when an abnormal sound is detected, whether or not the detected abnormal sound is associated with the designated abnormal sound detection area in the abnormality notification exclusion list,
refraining from performing an alert notification corresponding to the detected abnormal sound, when the detected abnormal sound is determined to be associated with the designated abnormal sound detection area in the abnormality notification exclusion list, and
performing an alert notification corresponding to the detected abnormal sound, when the detected abnormal sound is not determined to be associated with the designated abnormal sound detection area in the abnormality notification exclusion list.

2. The abnormal sound detection system of claim 1, wherein the processor forms directivity for the sound picked up by the sound pickup device, such that a formation range of the directivity is narrowed, as the image of the sound pickup area displayed on the display is enlarged, in response to the switching operation.

3. The abnormal sound detection system of claim 1, wherein the designated position is a substantially center position on the image of the sound pickup area, which is displayed on the display in response to the switching operation.

4. The abnormal sound detection system of claim 1, wherein the switching operation includes at least one of zoom-in, zoom-out, and drag operations.

5. The abnormal sound detection system of claim 4, wherein, in response to the drag operation performed when an image of the display range corresponding to the zoom-in operation is displayed on the display, the processor changes the directivity for the sound data from a direction toward an actual position corresponding to a designated position on an image of the sound pickup area displayed on the display before the drag operation to a direction toward an actual position corresponding to a designated position on an image of the sound pickup area displayed on the display after the drag operation.

6. The abnormal sound detection system of claim 1, wherein the processor sets a size of a formation range of the directivity for the sound to be constant even if the display range is switched.

7. The abnormal sound detection system of claim 1, wherein, when the image of the sound pickup area displayed on the display is a whole of an imaging possible area of the imaging device, the processor outputs sound data which is picked up by the sound pickup device omnidirectionally.

8. The abnormal sound detection system of claim 1, wherein the abnormal sound detection area is an area having a predetermined shape.

9. The abnormal sound detection system of claim 8, wherein the area having a predetermined shape is an area drawn by a predetermined input operation.

10. The abnormal sound detection system of claim 1, further comprising:
an additional imaging device and
an additional display that displays an image of the abnormal sound detection area, which is imaged by the additional imaging device and a subject of the alert notification, when a predetermined instruction operation for the alert notification is performed.

11. The abnormal sound detection system of claim 1, wherein the processor further performs operations including:
setting the plurality of abnormal sound detection areas, by using the image of the sound pickup area which is imaged by the imaging device.

12. An abnormal sound detection system comprising:
a sound pickup that acquires a sound in the sound pickup area including a plurality of abnormal sound detection areas,
an imaging sensor that images the sound pickup area;
a display that displays an image of the sound pickup area which is imaged by the imaging sensor;
a processor that performs operations comprising:
receiving a switching operation to switch a display range of the sound pickup area displayed on the display; and
forming directivity for the sound acquired by the sound pickup, in a direction toward an actual position corresponding to a designated position on the image of the sound pickup area displayed on the display, in response to the switching operation of the display range of the sound pickup area; and
a storage that stores an abnormality notification exclusion list in which each of the plurality of abnormal sound detection areas and an abnormal sound are associated with each other,
wherein the processor further performs operations including:

designating an abnormal sound detection area of the plurality of abnormal sound detection areas;

forming directivity for the sound acquired by the sound pickup, in a direction toward the designated abnormal sound detection area;

determining whether or not an abnormal sound is detected in the sound for which the directivity is formed;

determining, when an abnormal sound is detected, whether or not the detected abnormal sound is associated with the designated abnormal sound detection area in the abnormality notification exclusion list, refraining from performing an alert notification corresponding to the detected abnormal sound, when the detected abnormal sound is determined to be associated with the designated abnormal sound detection area in the abnormality notification exclusion list, and performing an alert notification corresponding to the detected abnormal sound, when the detected abnormal sound is not determined to be associated with the abnormal sound detection area in the abnormality notification exclusion list.

13. An abnormal sound detection method in an abnormal sound detection system including a sound pickup device and an imaging device, comprising:

picking up a sound in a sound pickup area including a plurality of abnormal sound detection areas by the sound pickup device;

imaging the sound pickup area by the imaging device;

displaying an image of the sound pickup area which is imaged by the imaging device on a display;

receiving a switching operation to switch a display range of the sound pickup area displayed on the display;

forming directivity for the sound picked up by the sound pickup device, in a direction toward an actual position corresponding to a designated position on the image of the sound pickup area displayed on the display, in response to the switching operation of the display range of the sound pickup area;

storing, in a storage, an abnormality notification exclusion list in which each of the plurality of abnormal sound detection areas and an abnormal sound are associated with each other;

designating an abnormal sound detection area of the plurality of abnormal sound detection areas;

forming directivity for the sound picked up by the sound pickup device, in a direction toward the designated abnormal sound detection area;

determining whether or not an abnormal sound is detected in the sound for which the directivity is formed;

determining, when an abnormal sound is detected, whether or not the detected abnormal sound is associated with the designated abnormal sound detection area in the abnormality notification exclusion list;

refraining from performing an alert notification corresponding to the detected abnormal sound, when the detected abnormal sound is determined to be associated with the designated abnormal sound detection area in the abnormality notification exclusion list; and performing an alert notification corresponding to the detected abnormal sound, when the detected abnormal sound is not determined to be associated with the abnormal sound detection area in the abnormality notification exclusion list.

14. An abnormal sound detection method in an abnormal sound detection apparatus including a sound pickup and an imaging sensor, comprising:

acquiring a sound in a sound pickup area including a plurality of abnormal sound detection areas;

acquiring an image of the sound pickup area;

displaying the acquired image of the sound pickup area on a display;

receiving a switching operation to switch a display range of the sound pickup area displayed on the display;

forming directivity for the acquired sound in a direction toward an actual position corresponding to a designated position on the image of the sound pickup area displayed on the display, in response to the switching operation of the display range of the sound pickup area;

storing, in a storage, an abnormality notification exclusion list in which each of the plurality of abnormal sound detection areas and an abnormal sound are associated with each other designating an abnormal sound detection area of the plurality of abnormal sound detection areas;

forming directivity for the acquired sound, in a direction toward the designated abnormal sound detection area;

determining whether or not an abnormal sound is detected in the sound for which the directivity is formed;

determining, when an abnormal sound is detected, whether or not the detected abnormal sound is associated with the designated abnormal sound detection area in the abnormality notification exclusion list, refraining from performing the alert notification corresponding to the detected abnormal sound, when the detected abnormal sound is determined to be associated with the designated abnormal sound detection area in the abnormality notification exclusion list, and performing an alert notification corresponding to the detected abnormal sound, when the detected abnormal sound is not determined to be associated with the abnormal sound detection area in the abnormality notification exclusion list.

* * * * *